(12) United States Patent
Fink

(10) Patent No.: US 8,403,353 B2
(45) Date of Patent: Mar. 26, 2013

(54) BOAT TRAILER WITH ROTATABLE SUPPORT FRAME

(75) Inventor: Andrew James Fink, Hamilton (NZ)

(73) Assignees: Andrew Fink Marine Limited, Hamilton (NZ); Maxiloda Corp., Ontario (CA)

( * ) Notice: Subject to any disclaimer, the term of this patent is extended or adjusted under 35 U.S.C. 154(b) by 20 days.

(21) Appl. No.: 12/905,764

(22) Filed: Oct. 15, 2010

(65) Prior Publication Data

US 2012/0091688 A1 Apr. 19, 2012

(51) Int. Cl.
*B60P 3/10* (2006.01)
(52) U.S. Cl. .................... 280/414.1; 280/789
(58) Field of Classification Search .................. None
See application file for complete search history.

(56) References Cited

U.S. PATENT DOCUMENTS

| | | | | |
|---|---|---|---|---|
| 2,754,129 A * | 7/1956 | Eckroad | ..................... | 280/43.18 |
| 2,984,498 A * | 5/1961 | Dewald | ..................... | 280/43.19 |
| 3,185,330 A * | 5/1965 | Buckner | ..................... | 414/476 |
| 3,945,521 A | 3/1976 | Decker | | |
| 5,393,191 A * | 2/1995 | Alexander | ..................... | 414/537 |
| 7,416,196 B2 * | 8/2008 | Brown | ..................... | 280/79.11 |
| 7,427,183 B2 * | 9/2008 | Stabeno | ..................... | 414/482 |

* cited by examiner

*Primary Examiner* — Tony Winner
(74) *Attorney, Agent, or Firm* — Maier & Maier PLLC

(57) ABSTRACT

The present invention relates to the field of boat trailers, and in particular, to boat trailers with rotatable support structures. The boat trailer includes a front end configured for hitching to a towing vehicle, a rear end, a wheel assembly disposed between the front and rear ends for rolling engagement with the ground and a support frame assembly carried on the wheel assembly. The support frame assembly has a lower base frame portion and an upper carousel frame portion superimposed on, and pivotally connected to, the base frame portion. The carousel frame portion is configured to support a boat thereon. Also provided is a support frame lifting assembly connected to the support frame assembly and the wheel assembly. The support frame lifting assembly is operable to raise at least a portion of the support frame assembly above the wheel assembly so as to permit rotation of the carousel frame portion relative to the base frame portion. Advantageously, this boat trailer may be used to reorient a boat carried on the support frame assembly for bow-first launching into water.

30 Claims, 29 Drawing Sheets

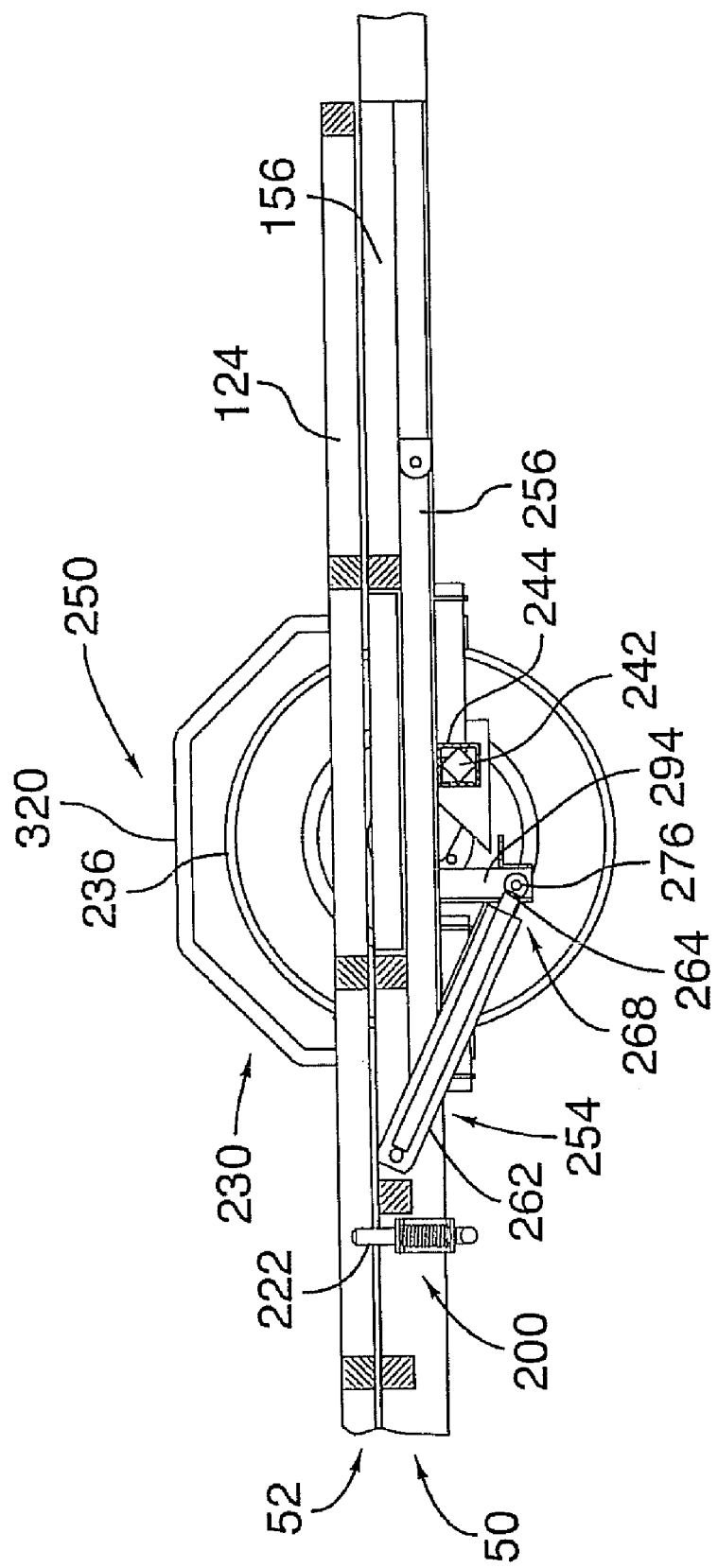

BOAT TRAILER WITH ROTATABLE SUPPORT FRAME

FIELD OF THE INVENTION

The present invention relates to the field of boat trailers, and in particular, to boat trailers with rotatable support structures.

BACKGROUND OF THE INVENTION

It is common for boats to be towed on a trailer behind a vehicle for transport to a suitable launch location. The trailer may be backed onto a boat ramp to allow such boats to be launched stern-first while still carried at the boat's trailed height. After the launching of the boat, the trailer is then driven from the boat ramp.

This type of launch may not be suitable in all circumstances. Under certain field conditions—for instance, where there are incoming waves to a boat ramp or the launching is from an unprepared surface such as a beach—this type of launch may be fraught with risk. Incoming waves may cause difficulties during the launch or shortly thereafter owing to the reduced capability of a stern to cut the waves. Broaching and/or sinking are a very real prospect in rough surf conditions.

In light of the foregoing, it would be desirable to have a boat trailer capable of launching a boat either bow-first or stern-first while still attached to a tow vehicle. Advantageously, such a boat trailer would tend to permit launching of a boat under various field conditions in a relatively safe manner.

SUMMARY OF THE INVENTION

According to a broad aspect of an embodiment of the present invention, there is provided a boat trailer. The boat trailer includes a front end configured for hitching to a towing vehicle, a rear end, a wheel assembly disposed between the front and rear ends for rolling engagement with the ground and a support frame assembly carried on the wheel assembly. The support frame assembly has a lower base frame portion and an upper carousel frame portion superimposed on, and pivotally connected to, the base frame portion. The carousel frame portion is configured to support a boat thereon. Also provided is a support frame lifting assembly In another feature, the wheel assembly includes at least one pair of wheels. The at least one pair of wheels includes first and second pairs of wheels arranged in tandem. In an additional feature, the wheel assembly includes a first wheel subassembly located adjacent one side of the support frame assembly, a second wheel assembly located adjacent an opposite side of the support frame assembly, and an axle subassembly connecting the first wheel subassembly to the second subassembly. In a further feature, the wheel assembly further includes a first fender assembly associated with the first wheel assembly and a second fender assembly associated with the second wheel assembly. The support frame lifting assembly is operable to raise at least a portion of the support frame assembly above the uppermost margin of the first and second fender assemblies. Additionally, the support frame lifting assembly is connected to the axle subassembly.

In another feature, the boat trailer is provided with a winch assembly and a winch post for supporting the winch assembly. The winch post is carried on the base frame portion at a location closer to the front end than to rear end.

In yet another feature, the base frame portion has an uppermost margin. The carousel frame portion has a lowermost margin. At least a portion of one of the uppermost margin and the lowermost margin is provided with a low friction surface to facilitate movement of the carousel frame portion relative to the base frame portion.

In still another feature, the boat trailer of claim 1 further includes means for preventing rotation of the carousel frame portion relative to the base frame portion. The rotation preventing means includes a first locking assembly disposed on one side of the support frame assembly and a second locking assembly disposed on an opposite side of the support frame assembly.

In an additional feature, the carousel frame portion includes a pair of first and second, spaced apart, side sills and a plurality of cross-members extending between the pair of first and second side sills to join one to the other. The base frame portion includes a pair of third and fourth, spaced apart, side sills and a plurality of crossmembers extending between the pair of third and fourth side sills to join one to the other. The first locking assembly is releasably engageable with the first side sill of the carousel frame portion and the third side sill of the base frame portion when the carousel frame portion and the base frame portion are oriented in a parallel direction. The second locking assembly is releasably engageable with the second side sill of the carousel frame portion and the fourth side sill of the base frame portion when the carousel frame portion and the base frame portion are oriented in a parallel direction. Additionally, the rotation preventing means includes at least one locking bar moveable between a locked position and an unlocked position. In the locked position, the locking bar extends above the lowermost margin of the carousel frame portion to thereby present a physical obstacle to the rotation of the carousel frame portion. In the unlocked position, the locking bar extends below the lowermost margin of the carousel frame portion to thereby permit rotation of the carousel frame portion. Optionally, the locking bar may be spring-loaded and biased in the locking position.

In a further feature, the carousel frame portion shares a common footprint with a portion of the base frame portion, when the carousel frame portion and the base frame portion are oriented in a parallel direction.

In yet another feature, the base frame portion is symmetrical about a longitudinal centerline. In still another feature, the carousel frame portion is symmetrical about a longitudinal centerline and/or a transverse centerline.

In still another feature, the carousel frame portion includes a cradle for supporting the hull of boat when it is loaded onto the support frame assembly. The carousel frame portion is provided with a pair of first and second, spaced apart, side sills and a plurality of crossmembers extending between the pair of first and second side sills to join one to the other; a first support guide rail assembly mounted to the first side sill; a second support guide rail assembly mounted to the second side sill; and a first set of rollers centrally disposed between the first and second side sills in a tandem arrangement. The first and second support guide rail assemblies and the first set of rollers cooperate with each other to define the cradle. In an additional feature, the first and second support guide rail assemblies are canted inwardly toward each other. In yet another feature, each support guide rail assembly includes a support guide rail carried above the first set of rollers and a plurality of support posts for attaching the guide rail to one of the first and second side sills. Each support guide rail assembly includes a second set of rollers carried on the guide rail.

In one feature, the portion of the support frame assembly raised above the wheel assembly includes the carousel frame portion. In another feature, the support frame lifting assembly is disposed closer to the rear end of the boat trailer than to the front end of the boat trailer. In a further feature, the support frame lifting assembly includes at least one piston and at least one pivot arm. The at least one piston has a first end pivotally connected to the support frame assembly at a first location thereon and a second end pivotally connected to the wheel assembly at a second location thereon. The first location on the support frame member is disposed rearward of the second location on the wheel assembly. The at least one pivot arm has a first end and a second end. The first end of the at least one pivot arm is pivotally connected to the support frame assembly at a third location thereon. The third location on the support frame assembly is disposed forwardly of the first location on the support frame assembly. The at least one pivot arm is fixed to the wheel assembly at a fourth location intermediate the first and second ends of the at least one pivot arm.

In an alternate feature, the support frame lifting assembly includes at least one piston and at least one pivot arm. The at least one piston has a piston cylinder pivotally connected to the support frame assembly, and a piston rod mounted to extend within the piston cylinder and pivotally connected to the wheel assembly. The piston rod is moveable between an extended position and a retracted position. The at least one pivot arm has a first end pivotally connected to the support frame assembly, and a second end. The at least one pivot arm is fixed to the wheel assembly at a location intermediate the first and second ends of the at least one pivot arm. As the piston rod moves to the extended position, a portion of the support frame assembly is raised above the wheel assembly. Additionally, least one piston may be selected from the group consisting of: (a) a hydraulic piston; (b) a pneumatic piston. Optionally, the at least one piston includes a first piston associated with one side of the support frame assembly and a second piston associated with an opposite side of the support frame assembly. The at least one pivot arm includes a first pivot arm associated with the one side of the support frame assembly and a second pivot arm associated with the opposite side of the support frame assembly.

According to another broad aspect of an embodiment of the present invention, there is provided a vehicle trailer. The vehicle trailer includes a front end configured for hitching to a towing vehicle, a rear end, a wheel assembly disposed between the front and rear ends for rolling engagement with the ground and a support frame assembly carried on the wheel assembly. The support frame assembly has a lower base frame portion and an upper carousel frame portion superimposed on, and pivotally connected to, the base frame portion. The carousel frame portion is configured to support a vehicle thereon. Also provided is a support frame lifting assembly connected to the support frame assembly and the wheel assembly. The support frame lifting assembly is operable to raise at least a portion of the support frame assembly above the wheel assembly so as to permit rotation of the carousel frame portion relative to the base frame portion.

According to still another broad aspect of an embodiment of the present invention, there is provided a trailer. The trailer includes a front end configured for hitching to a towing vehicle, a rear end, a wheel assembly disposed between the front and rear ends for rolling engagement with the ground and a support frame assembly carried on the wheel assembly. The support frame assembly has a lower base frame portion and an upper carousel frame portion superimposed on, and pivotally connected to, the base frame portion. The carousel frame portion is configured to support lading thereon. Also provided is a support frame lifting assembly connected to the support frame assembly and the wheel assembly. The support frame lifting assembly is operable to raise at least a portion of the support frame assembly above the wheel assembly so as to permit rotation of the carousel frame portion relative to the base frame portion.

According to yet another broad aspect of an embodiment of the present invention, there is provided a trailer. The trailer includes a front end configured for hitching to a towing vehicle, a rear end, a wheel assembly disposed between the front and rear ends for rolling engagement with the ground and a support frame assembly carried on the wheel assembly. The support frame assembly has a lower base frame portion and an upper carousel frame portion superimposed on, and pivotally connected to, the base frame portion. The carousel frame portion is configured to support lading thereon. Also provided is means for preventing rotation of the carousel frame portion relative to the base frame portion.

BRIEF DESCRIPTION OF THE DRAWINGS

The embodiments of the present invention shall be more clearly understood with reference to the following detailed description of the embodiments of the invention taken in conjunction with the accompanying drawings, in which:

FIG. 9 is an enlarged partial cross-sectional view of the boat trailer shown in FIG. 6 taken along line "9-9";

DETAILED DESCRIPTION OF EMBODIMENTS OF THE INVENTION

Figure 1:
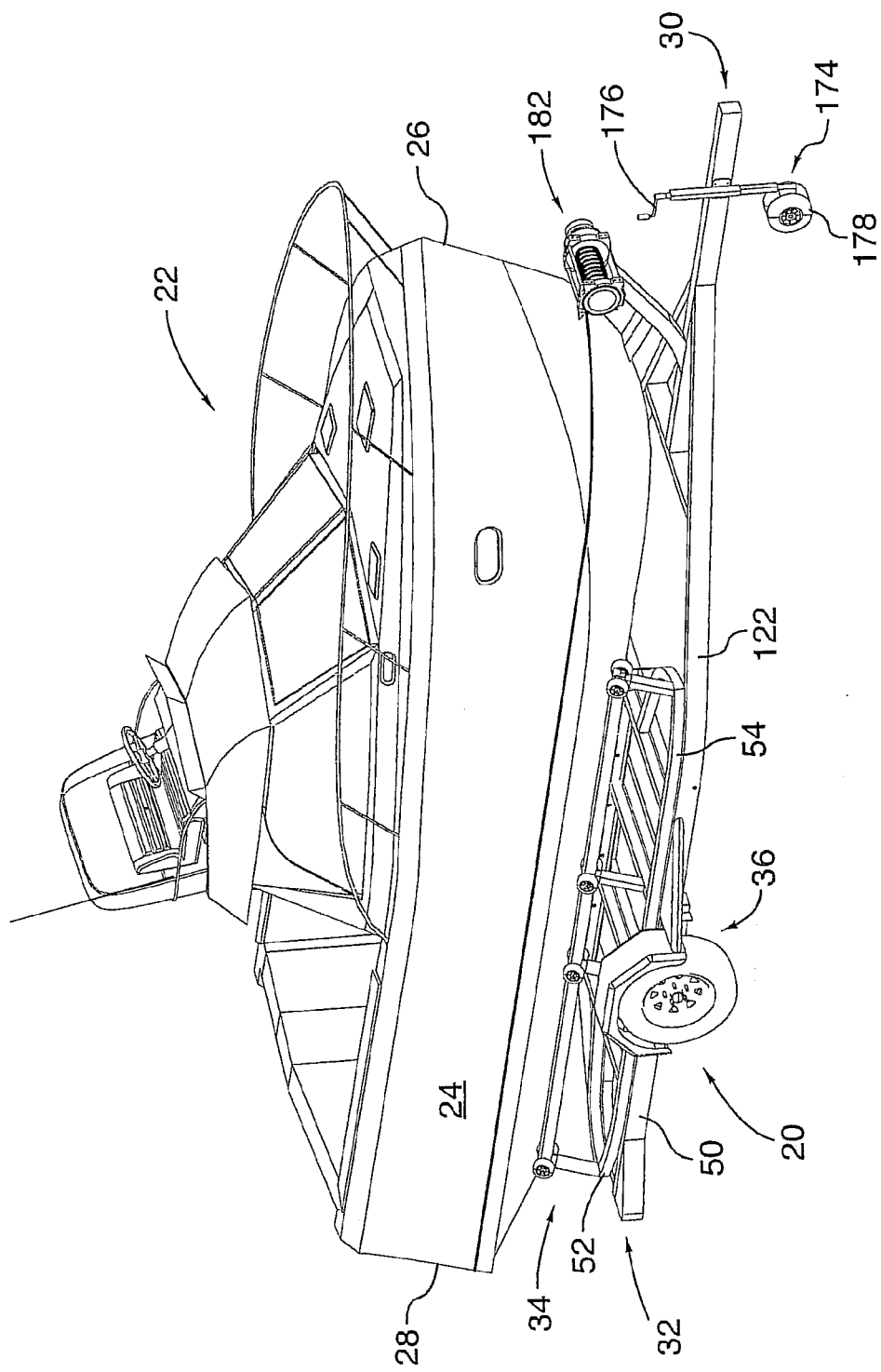
FIG. 1 is a top front perspective view of a boat trailer carrying a boat on a support frame assembly in accordance with an embodiment of the invention, the support frame assembly shown disposed in its lowered, towing configuration.

The description, which follows, and the embodiments described therein are provided by way of illustration of an example, or examples of particular embodiments of principles and aspects of the present invention. These examples are provided for the purposes of explanation and not of limitation, of those principles of the invention. In the description that follows, like parts are marked throughout the specification and the drawings with the same respective reference numerals.

Referring to FIGS. 1, 2A, 3, 4 and 5, there is shown a boat trailer, designated generally with reference numeral 20. The boat trailer 20 is configured to carry a boat 22. The boat 22 may be tied to the boat trailer 20 by chains or tie-downs (not shown). In this embodiment, the boat 22 may be a motor boat. In other embodiments, the boat could be a sailboat, a dinghy, a catamaran or any other similar watercraft capable of being carried on a trailer and launched from a trailer. The motor boat 22 has a generally V-shaped hull 24 provided with a keel 25 extending between the bow 26 of the boat 22 and the stern 28 thereof. In other embodiments, the hull 24 could have a different shape.

Figure 2A:
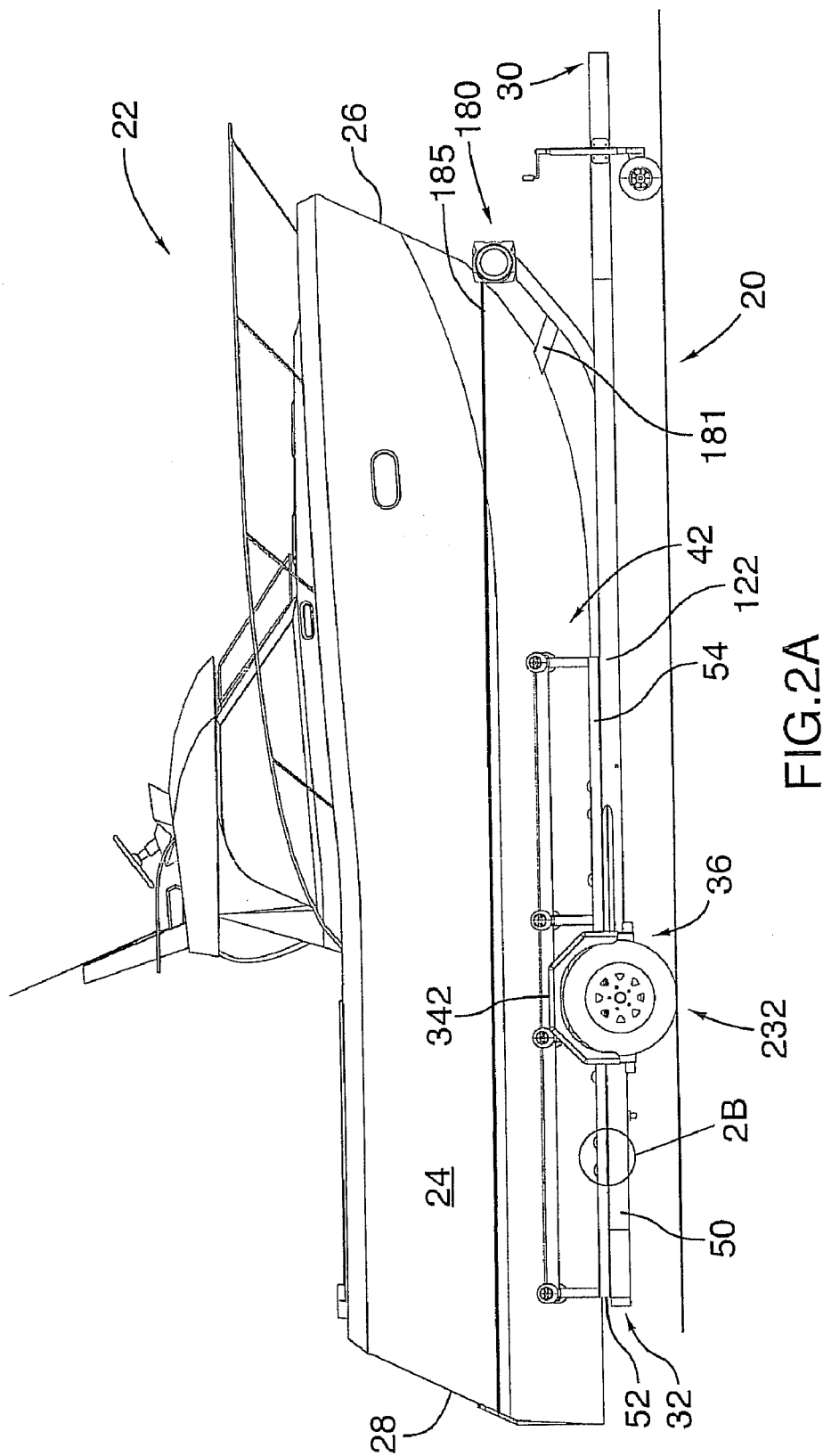
FIG. 2A is a side elevation view of the boat trailer and the boat shown in FIG. 1.
Figure 3:
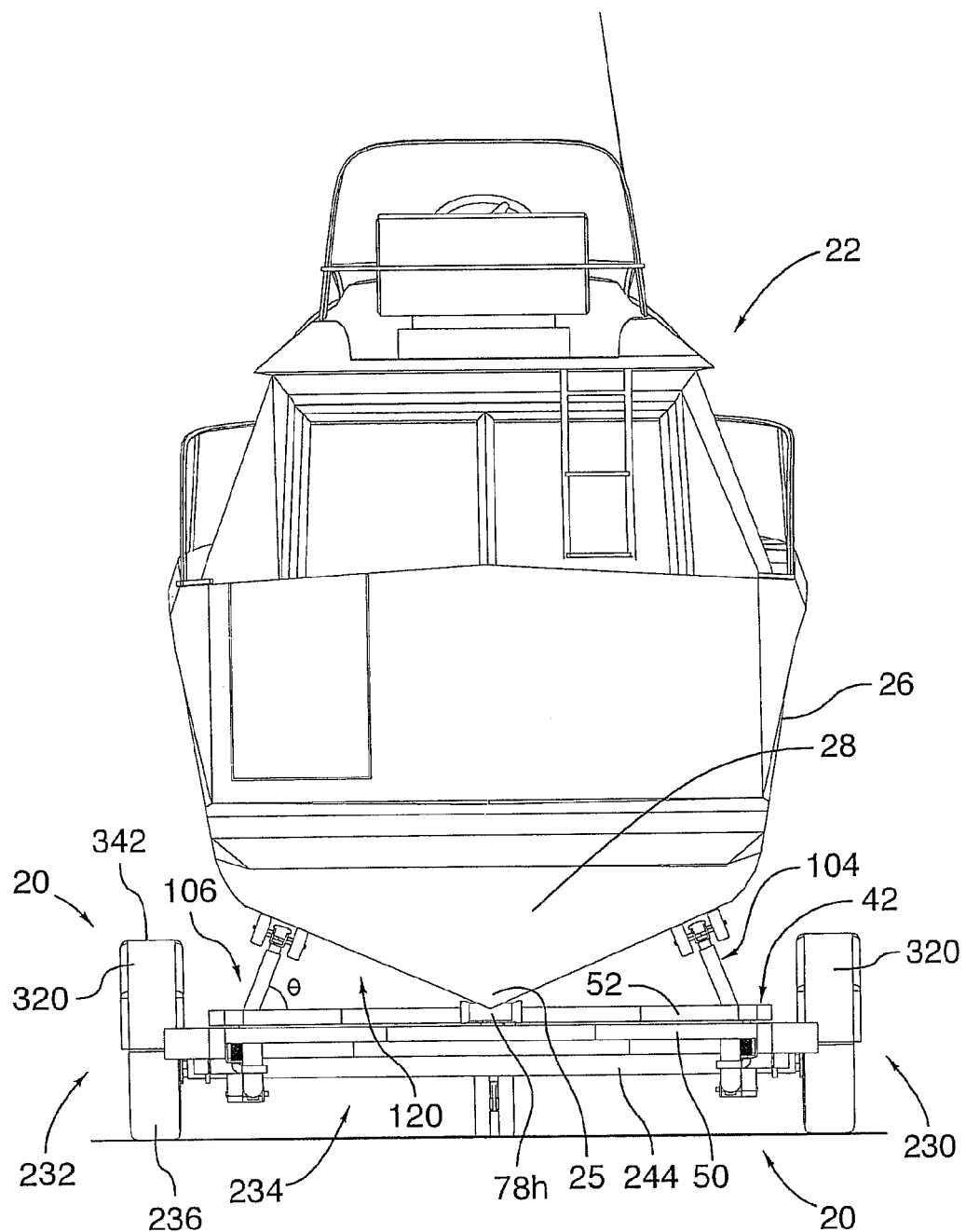
FIG. 3 is rear end elevation view of the boat trailer and the boat shown in FIG. 1.
Figure 4:
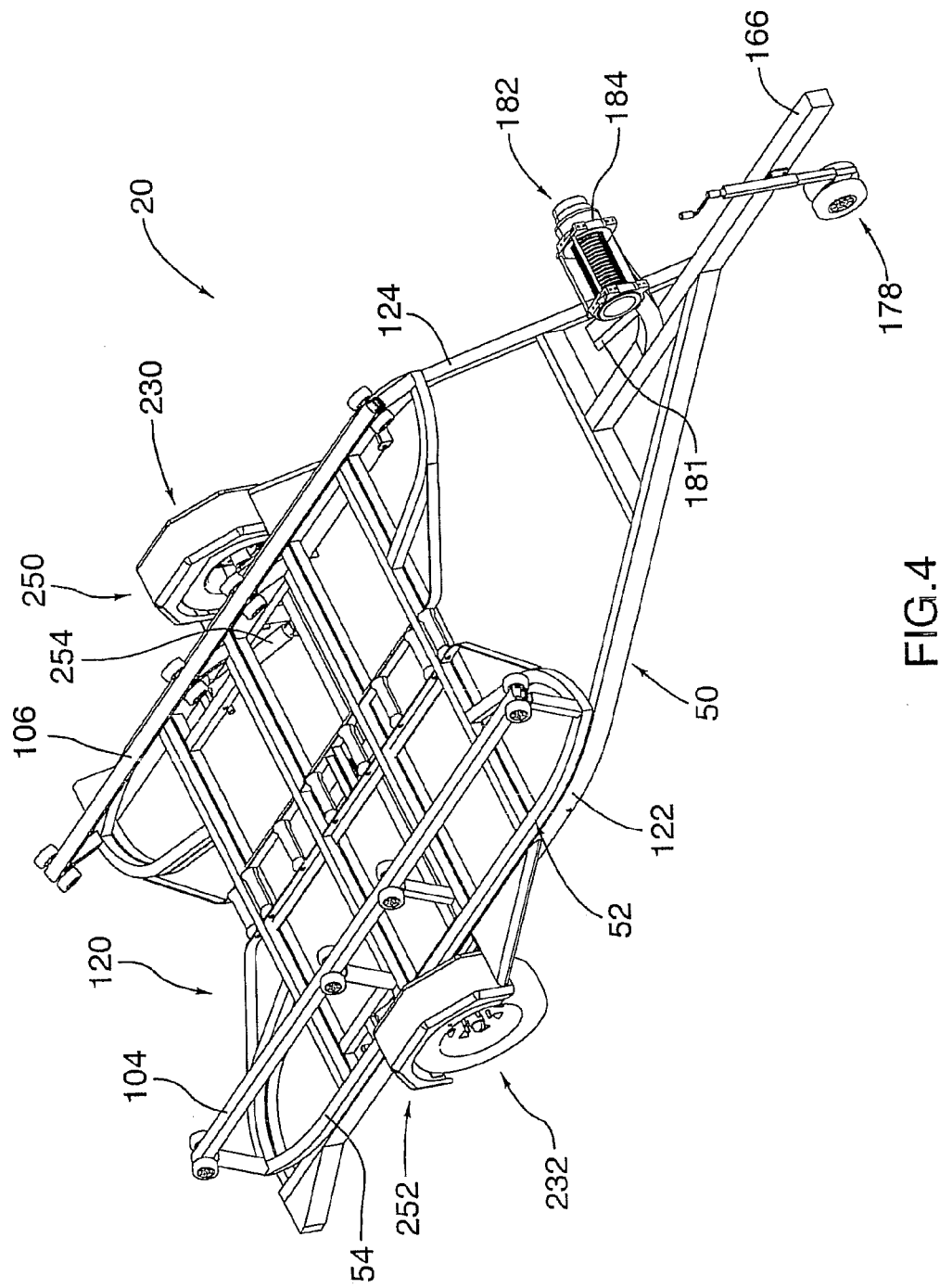
FIG. 4 is a top front perspective view of the boat trailer of FIG. 1 shown isolation.
Figure 10:
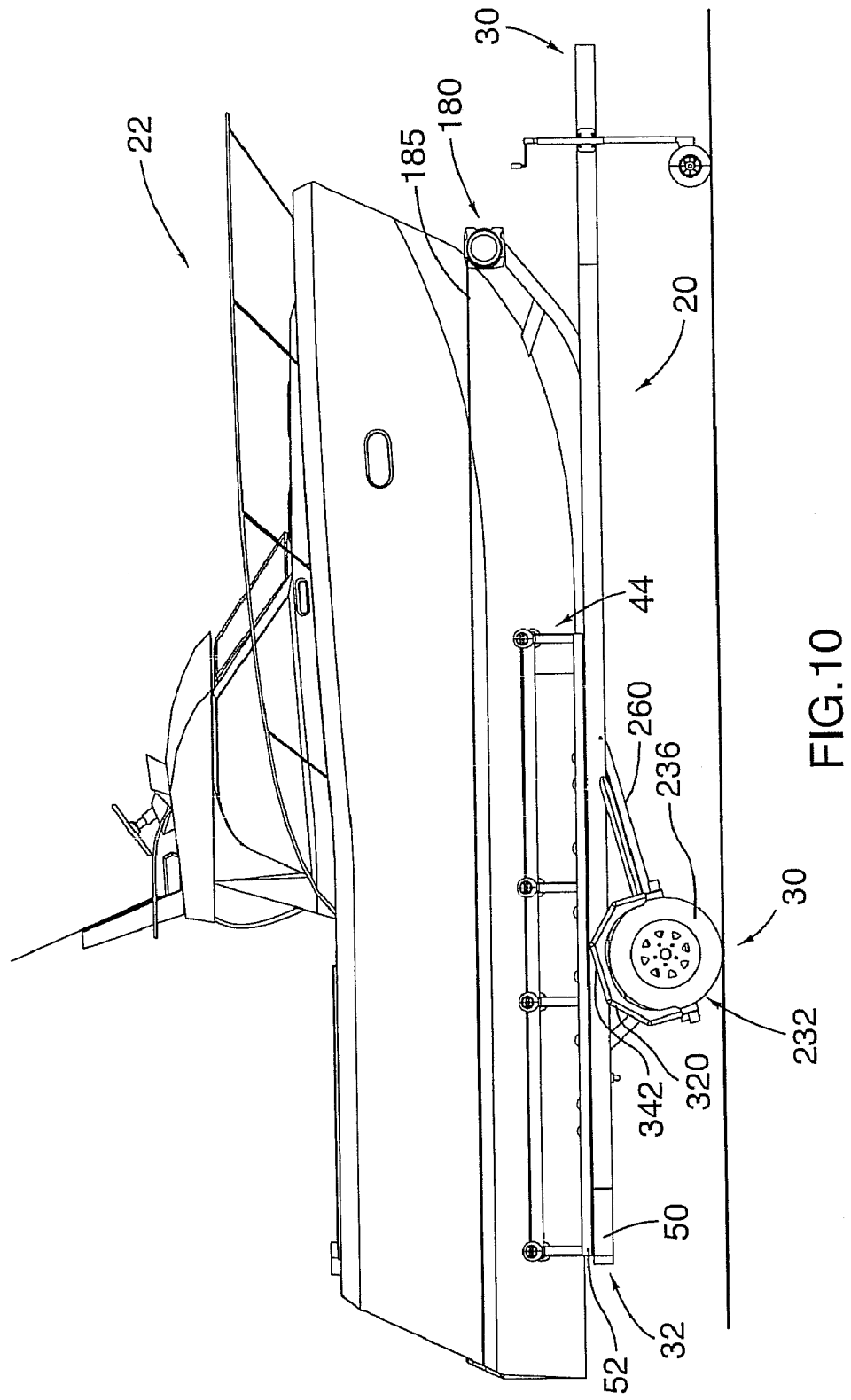
FIG. 10 is a side elevation view of the boat trailer and boat shown in FIG. 1 showing the support frame assembly disposed in its raised, rotatable configuration.
Figure 11:
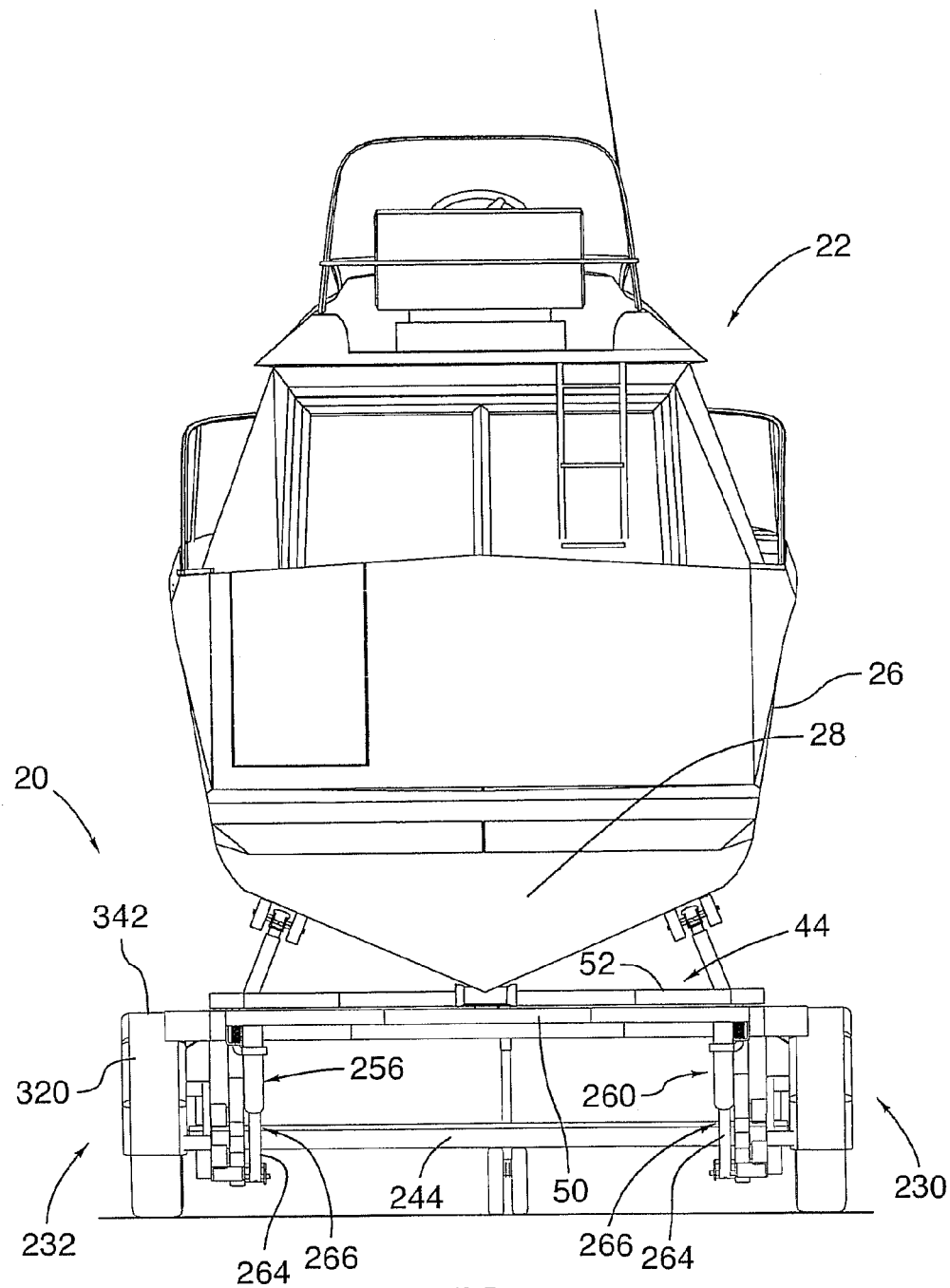
FIG. 11 is rear end elevation view of the boat trailer and the boat shown in FIG. 10.

The boat trailer 20 is designed to be hitched to the rear of a motor vehicle (not shown) and towed. The boat trailer 20 includes a front end 30, a rear end 32, a support frame assembly 34 extending between the front and rear ends 30 and 32 upon which may be loaded boat 22, a wheel assembly 36 for rolling engagement with the ground, and a support frame lifting assembly 40 operable to raise the support frame assembly 34 above the wheel assembly 36. The lifting assembly 40 allows the support frame assembly 34 to be deployed in a lowered, towing configuration 42 (as best shown in FIGS. 2A and 3) and in a raised, rotatable configuration 44 (as best shown in FIGS. 10 and 11). As explained in greater detail below, when the support frame assembly 34 is in the raised configuration 44, a portion of the support frame assembly 34 is rotatable so as to allow the orientation of the bow 26 of the boat 22 to be changed from a front-facing orientation to a rear-facing orientation, or vice versa.

With specific reference to FIGS. 4 to 7, the support frame assembly 34 includes a lower base frame portion 50 and an upper carousel (or turntable) frame portion 52 superimposed on, and pivotally connected to, the base frame portion 52. The carousel frame portion 52 has a shape that vaguely resembles a butterfly. It is built up of a plurality of hollow structural steel (HSS) sections welded to each other to form an integrated frame. While in this embodiment, the HSS sections have a substantially square profile, in alternative embodiments, HSS sections with different profiles could be used. The HSS sections making up the carousel frame portion 52 include a pair of spaced apart longitudinal side sills 54 and 56, and a plurality of spaced apart cross-members designated generically with reference number 58, extending between the longitudinal side sills 54 and 56 and joining the latter to each other. To prevent seawater from filling the hollows within the cross-members 58 and possibly, corroding the carousel frame portion 52 from the inside, the cross-members are sealed after being galvanized. Advantageously, this tends to preserve and extend the service life of the boat trailer 20.

In this embodiment, the plurality of cross-members 58 includes a front cross-member 58a, a rear cross-member 58b and first and second interior cross-members 58c and 58d arranged intermediate the front and rear cross-members 58a and 58b. The first interior cross-member 58c is disposed closer to the front cross-member 58a than to the rear cross-member 58b, while the second interior cross-member 58d is disposed closer to the rear cross-member 58b than to the front cross-member 58a. In other embodiments, a greater or lesser number of cross-members may be provided.

Each longitudinal side sill 54, 56 has a front portion 70, a rear portion 72 and an intermediate portion 74 running between the front and rear portions 70 and 72. The intermediate portion 74 is substantially straight, while the front and rear portions 70 and 72 bow generally inwards toward the opposed side sill 54, 56 (as the case may be). Welded to the terminal ends of each portion 70, 72 is a bent structural member identified generically with reference numeral 76. Four bent structural members—members 76a, 76b, 76c and 76d—are provided. Bent structural member 76a is welded at one end to the terminal end of the front portion 70 of longitudinal side sill 54, and at the other end to the front face of the front cross-member 58a. In like fashion, bent structural member 76b is welded at one end to the terminal end of the rear portion 72 of longitudinal side sill 54, and at the other end to the rear face of the rear cross-member 58b. Bent structural members 76c and 76d are similarly mounted to the front and rear portions 70 and 72 of longitudinal side sill 56, respectively, and to the front and rear cross-members 58a and 58b, respectively.

Centrally disposed between the longitudinal side sills 54 and 56 is a series of polyurethane (or rubber) rollers 78 laid out in a tandem arrangement. These rollers are configured to rollingly engage the keel 25 of the boat 22 to facilitate loading of the boat onto the support frame assembly 34, or launching of the boat 22 therefrom. In this embodiment, the series of rollers 78 includes first, second, third, fourth, fifth, sixth, seventh and eight cylindrical rollers 78a, 78b, 78c, 78d, 78e, 78f, 78g and 78h. In other embodiments, a greater or lesser number of rollers may be used as appropriate for a particular application.

The first roller 78a is positioned forward of the front cross-member 58a and is held in place by a pair of first and second dog-legged bracket members 80 and 82. The first bracket member 80 is attached at one end to the front cross-member 58a and at the other end to the bent structural member 76a. Similarly, the second bracket member 82 is attached at one end to the front cross-member 58a and at the other end to the bent structural member 76c. The second and third rollers 78b and 78c are disposed between the front cross-member 58a and the first interior cross-member 58c and are retained by a pair of opposed angle members 84 and 86 spanning cross-members 58a and 58c. The fourth and fifth rollers 78d and 78e are arranged between the first and second interior cross-member 58c and 58d and are retained by a pair of opposed angle members 88 and 90 spanning cross-members 58c and 58d. The sixth and seventh rollers 78f and 78g are disposed between the second interior cross-member 58d and the rear cross-member 58b and are retained by a pair of opposed angle members 92 and 94 spanning cross-members 58d and 58b. Lastly, the eight roller 78h is positioned rearward of the rear cross-member 58b and is held in place by a pair of first and second dog-legged bracket members 96 and 98. The first bracket member 96 is attached at one end to the rear cross-member 58b and at the other end to the bent structural member 76b. Similarly, the second bracket member 98 is attached at one end to the rear cross-member 58b and at the other end to the bent structural member 76d.

A channel member 100 (best shown in FIGS. 5 and 6) spans between, and is welded to the angle members 88 and 90. It is arranged in tandem between the fourth and fifth rollers 78d and 78e and is oriented with its legs facing upwards. Defined through the back of channel member 100 is an aperture (not visible) for receiving a pivot pin 102. In this preferred embodiment, the pin 102 forms the pivot connection between the carousel frame portion 52 and the base frame portion 50. However, this need not be the case in every application. In other embodiments, it may be possible to use an arrangement of roller bearings disposed between the base frame portion and the carousel frame portion to allow pivotal movement. In yet other embodiments, a circular rail system mounted between the base frame portion and curved frame portion could be employed. Further still, a stub axle and journal arrangement can be used to effect pivotal movement of the carousel frame portion relative to the base frame portion.

The carousel frame portion 52 is also provided with a pair of opposed, first and second, support guide rail assemblies 104 and 106. Each support guide rail assembly 104, 106 includes a longitudinally extending guide rail 108 carried above the rollers 78 and a plurality of support posts—in this embodiment four support posts 110, 112, 114 and 116—for attaching each guide rail 108 to longitudinal side sill 54, 56 (as the case may be) and the cross-members 58c and 58d. Depending downwardly from each guide rail 108 are four post portions (not visible) which are configured to fit within openings defined in the four support posts 110, 112, 114 and 116. The height at which each guide rail 108 is carried above the rollers 78 may be adjusted by having more (or less) of the guide rail post portions extend into the support posts. Adjacent each post portion, there is provided a pair of rollers 118 for rollingly engaging the hull 24 of the boat 22. In total, each guide rail 108 has four pairs of rollers 118.

As best shown in FIG. 3, the first and second support guide rail assemblies 104 and 106 are canted inwardly toward each other so that the pairs of rollers 118 on the guide rails 108 engage the port and starboard sides of the boat's hull 24. It will this be appreciated that configured in this manner, the first and second support guide rail assemblies 104 and 106 along with rollers 78 cooperate to define a cradle 120 for supporting the hull 24 of boat 22 when it is loaded onto the support frame assembly 34.

In this embodiment, the angle $\theta_1$ formed between the support posts 110, 112, 114 and 116 and the top faces of the cross-members 58c and 58d measures 68 degrees. This need not be the case in every application. In alternative embodiments, a different (larger or smaller angle) could be used. In still other embodiments, it may be possible to configure the support guide rail assemblies with a variable angle $\theta_1$ to allow the orientation of the assemblies to be modified to accommodate boats with differently-shaped hulls. This could be achieved, for instance, by replacing the fixed connection between the support posts on the one hand, and the longitudinal sides sills and cross-members on the other hand, with a pivotal connection that can be locked in place. In still other embodiments, the support guide rail assemblies could be designed to be releasably detachable from the carousel frame portion. Other modifications are possible.

Figure 6:
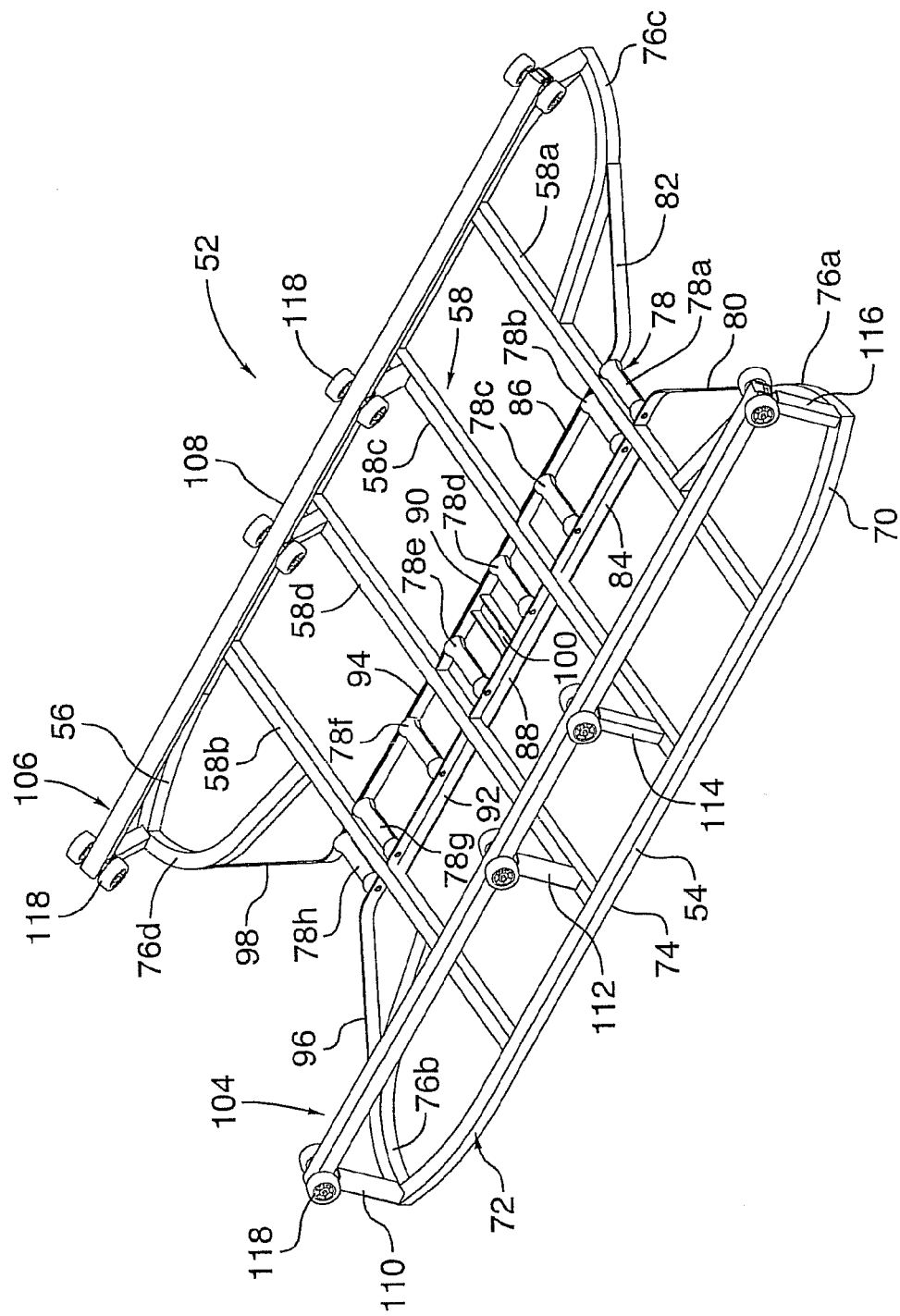
FIG. 6 is a top front perspective view of the upper rotatable carousel frame portion of the support frame assembly of FIG. 4 shown in isolation.

In the embodiment shown in FIG. 6, the carousel frame portion 52 is symmetrical about a longitudinal centerline $CL_1$ such that the arrangement of side sill 54, cross-members 58a, 58b, 58c and 58d, and the support guide rail assembly 104 is a mirror image of the arrangement of side sill 56, cross-members 58a, 58b, 58c and 58d, and the support guide rail assembly 106. Along the same vein, the carousel frame portion 52 is also symmetrical about a transverse centerline $CL_2$ such that the front and rear of the carousel frame portion 52 are also mirror images one of the other. This symmetry along the centerlines $CL_1$ and $CL_2$ tends to be preferred because it obviates the need to return the carousel frame portion 52 back to its original orientation after launching the boat 22. Since the front and rear of the carousel frame portion 52 are identical to each other, the boat 22 can be loaded onto the support frame assembly from either end of the carrousel frame portion 52. While not generally preferred, the carousel frame portion could be designed to be asymmetrical about one or both the longitudinal centerlines $CL_1$ and $CL_2$.

Figure 7:
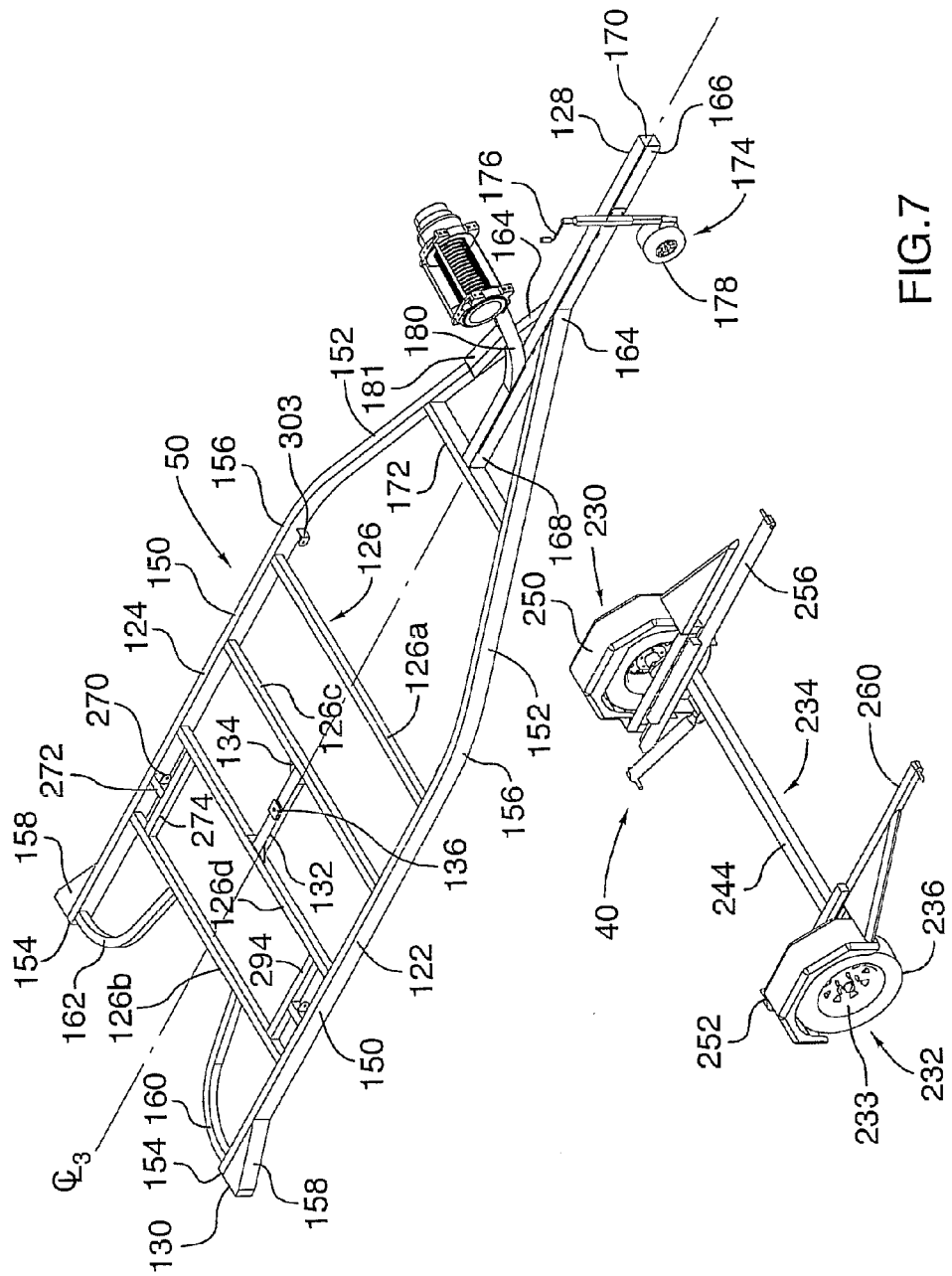
FIG. 7 is a top front perspective view of the lower fixed base frame portion of the support frame assembly of FIG. 4 shown exploded from the wheel assembly and the support frame lifting assembly.

Referring now to FIG. 7, the base frame portion 50 is of welded construction and is made up of a pair of opposed, first and second side sills 122 and 124 and a plurality of cross-members identified generically with reference numeral 126 extending between first and second side sills 122 and 124 and joining the latter to each other. The side sills 122 and 124 and cross-members 126 are welded to each other to form an integrated frame. Much like the cross-members 58 of the carousel frame portion 52, the cross-members 126 are fabricated from HSS sections having a substantially square profile and are sealed to prevent water from infiltrating and accumulating within the hollows of the cross-members 126.

In this embodiment, the plurality of cross-members 126 includes a front cross-member 126a, a rear cross-member 126b and first and second interior cross-members 126c and 126d arranged intermediate the front and rear cross-members 126a and 126b. The first interior cross-member 126a is positioned approximately midway between the front and rear ends 128 and 130 of the base frame portion 50. The first interior cross-member 126c is disposed closer to the front cross-member 126a than the rear cross-member 126b, while the second interior cross-member 126d is disposed closer to the rear cross-member 58b than to the front cross-member 126a. In other embodiments, a greater or lesser number of cross-members may be provided.

A longitudinal stringer 132 oriented generally parallel to side sills 122 and 124 runs between, and is welded to, the first and second interior cross-members 126c and 126d. Triangular gusset plates 134 reinforce the welded connection between the stringer 132 and the cross-members 126c and 126d. The stringer 132 has an apertured plate 136 fixed to its top face. During assembly of the support frame assembly 34, the back of channel member 100 will be brought to rest on the apertured plate 136. The aperture defined in the plate 136 will be aligned with the aperture defined in the back of channel member 100 and the pivot pin 102 will be inserted through the aligned apertures. Assembled in this manner, the carousel frame portion 52 sits directly on the base frame portion 50 in abutting relation therewith. To minimise friction between the channel member 100 and the apertured plate 136 which might otherwise impede rotation of the carousel frame portion 52 relative to the base frame portion 50, the apertured plate 136 is made of a low friction bearing material.

Figure 2B:
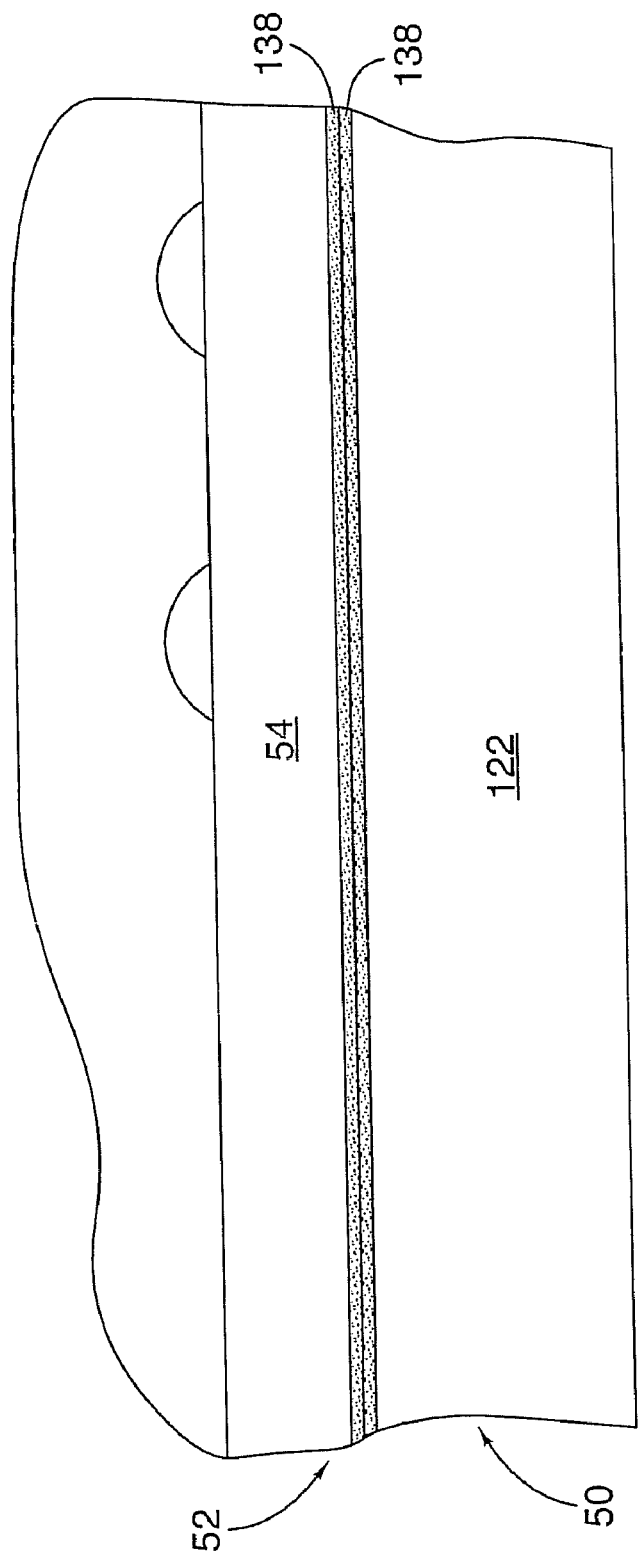
FIG. 2B is a magnified view of the boat trailer depicted in the encircled portion "2B" in FIG. 2A.

Similarly, the entire underside (or at least a portion—preferably, a substantial portion) of the carousel frame portion 52 and the entire topside (or at least a portion—preferably, a substantial portion) of the base frame portion 50 (and more specifically, the faces on each of frame portions 52 and 50 which are in direct contact with each other) are wrapped in a low friction bearing material 138. For purposes of illustration, the low friction bearing material 138 is shown in FIG. 2B wrapped on the underside of side sill 54 forming part of the carousel frame portion 52 and on the topside of side sill 122 forming part of the base frame portion 50. The depiction of the low friction bearing material on portions of the support frame assembly 34 has been omitted in the other drawings for the sake of clarity. In alternative embodiments, this low friction bearing material could be replaced with a low friction coating or treatment on the carousel frame portion and the base frame portion, or omitted altogether.

Figure 5:
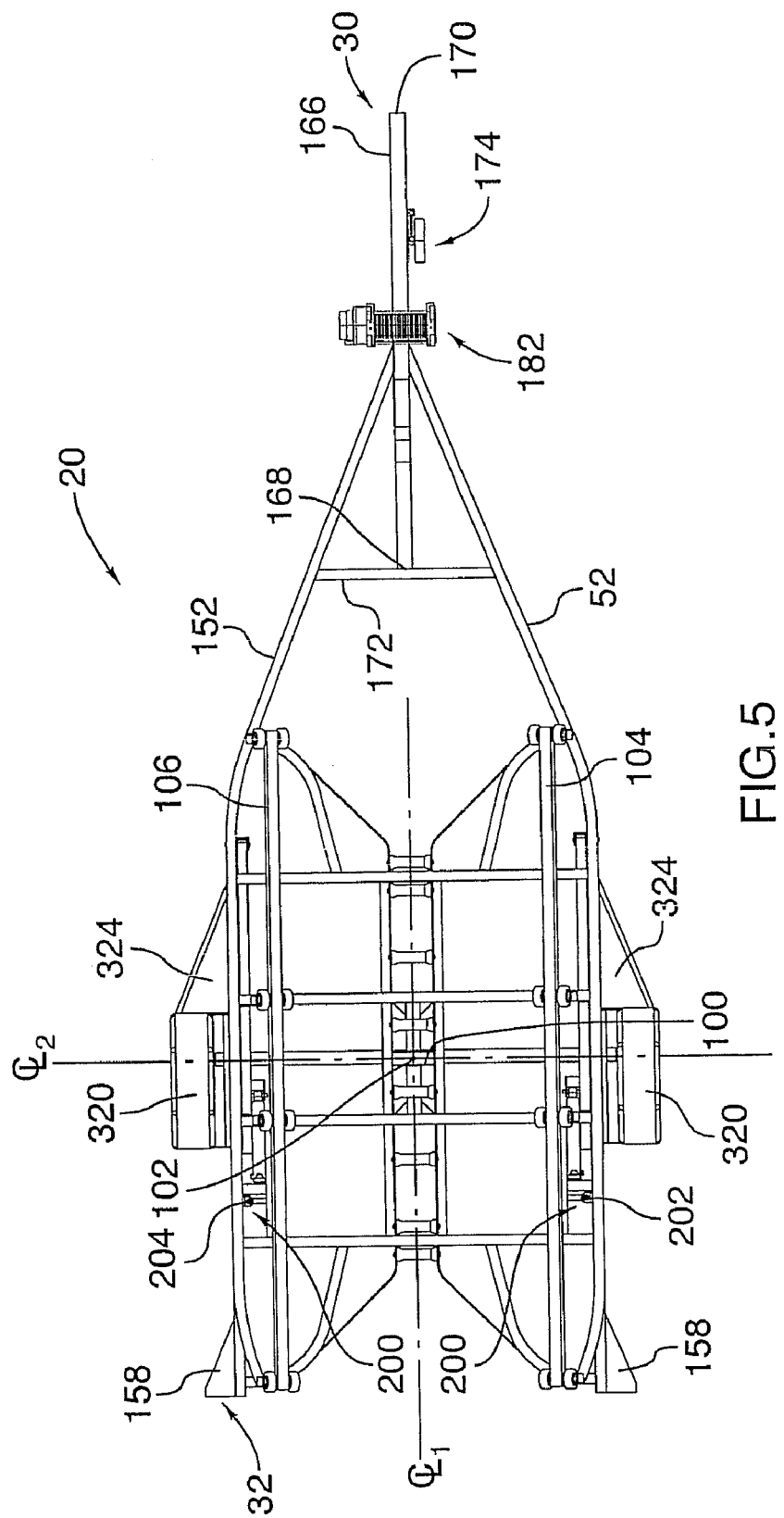
FIG. 5 is a top plan view of the boat trailer shown in FIG. 4.

Each side sill 122, 124 has a generally dog-legged shape defined by a first, longitudinally extending, straight portion 150 and a second, bent portion 152. The straight portion 150 has a rear extremity 154 which projects beyond the rear cross-member 126b and a front extremity 156 at which the side sill 122, 124 transitions to the bent portion 152. Fixed to the rear extremity 154 of side sill 122, 124 on the outer face thereof, is a triangular protective housing 158 containing the tail light assembly (not shown). As best shown in FIG. 5, the configuration of the housing 158 and the location of its attachment, impart a fin-like appearance to the rear extremity 154 of the side sills 122 and 124 and tends to provide enhanced protection for the tail light assembly.

To further reinforce the side sill 122 (and the base frame portion 50) in the vicinity of rear extremity 154, a bent structural member 160 is welded at one end to the inner face of the side sill 122 and at the other end to the rear face of the rear cross-member 126b. Similar reinforcement is provided to side sill 124 with the provision of bent structural member 162. In that case, one end of the bent structural member 162 is welded to the inner face of the side sill 124 while the other end thereof is welded to the rear face of the rear cross-member 126b.

At the front of the base frame portion 50, the bent portions 152 of the side sills 122 and 124 co-operate with each other to impart to define a tapering profile. The terminal ends 164 of bent portions 152 are welded to the opposed outer faces of an elongate tongue 166 that is centrally disposed between the side sills 122 and 124. The tongue 166 has a rear proximal end 168 and a front free or distal end 170. The proximal end 168 is tied to a short crossbar 172 that extends between the bent portions 152 of the side sills 122 and 124. The tongue 166 and the short crossbar 172 are arranged in a T-shaped configuration. The distal end 170 projects from the front of the base frame portion 50 and carries a coupler (not shown) for connecting the boat trailer 20 to the hitch (not shown) of a motor vehicle. At a location closer to the distal end 170 than to the proximal end 168, the tongue 166 holds an auxiliary wheel assembly 174 which may be deployed to create a three-point surface contact between the boat trailer 20 and the ground. The auxiliary wheel assembly 174 is outfitted with small, manually actuated crank 176 which is operable to selectively raise wheel 178 away from the ground or lower the wheel 178 onto the ground for rolling contact therewith. When not in use, the auxiliary wheel assembly 174 can be rotated away from the ground at 90 degrees in a clockwise or counterclockwise direction.

A support arm or winch post 180 projects forward from the top face of the tongue 166 at an angle. The winch post 180 carries a rearwardly oriented snubbing block 181 and a winch assembly 182 which may be used when loading the boat 22 onto the boat trailer 20. The winch assembly 182 includes a spool 184 upon which is wound a length of cable 185, and a hand actuated crank 186 for rotating the spool 184 to selectively take up or let out cable 185. When the cable 185 is tied to the bow 26 of the boat 22, the winch assembly 182 can be used to load the boat 22 onto the boat trailer 20. As explained in greater detail below, when the cable 185 is tied to the stern 28 of the boat 22, the winch assembly may be employed to rotate the carousel frame portion 52.

In this embodiment, the snubbing block 181 is connected to the winch post 180 by a telepscopic connection arm (not shown). The telescopic capability of the connection arm allows the snubbing block 181 to be retracted prior to the carousel frame portion 52 being rotated so as not to present a physical obstacle to the rotation. In an alternative embodiment, the snubbing block could be configured differently. For example, it could be designed to be rotated out of engagement with the hull to allow unobstructed rotation of the carousel frame portion.

As shown in FIG. 5, the carousel frame portion 52 is superimposed on a portion of the base frame portion 50 and shares a common footprint with that portion of the base frame portion 50 when both are oriented in the same direction, affording a streamlined profile to the support frame assembly 34. While this is generally preferred, in alternative embodiments, the footprint of the carousel frame portion could be sized smaller or larger than the footprint of the base frame portion.

The support frame assembly 34 is further provided with means 200 for locking (or preventing rotation of) the carousel frame portion 52 relative to the base frame portion 50 to prevent rotation of the former relative to the latter when the support frame assembly 34 is in its raised, rotatable configuration 44. In this embodiment, the locking or rotation preventing means 200 is embodied in a pair of spring-loaded, first and second locking assemblies 202 and 204. As shown in FIG. 5, the first locking assembly 202 is mounted to the straight portion 150 of the side sill 122 at a location closer to the rear extremity 154 than to the front extremity 156. The second locking assembly 204 is similarly mounted to the straight portion 150 of the side sill 124.

Figure 12A:
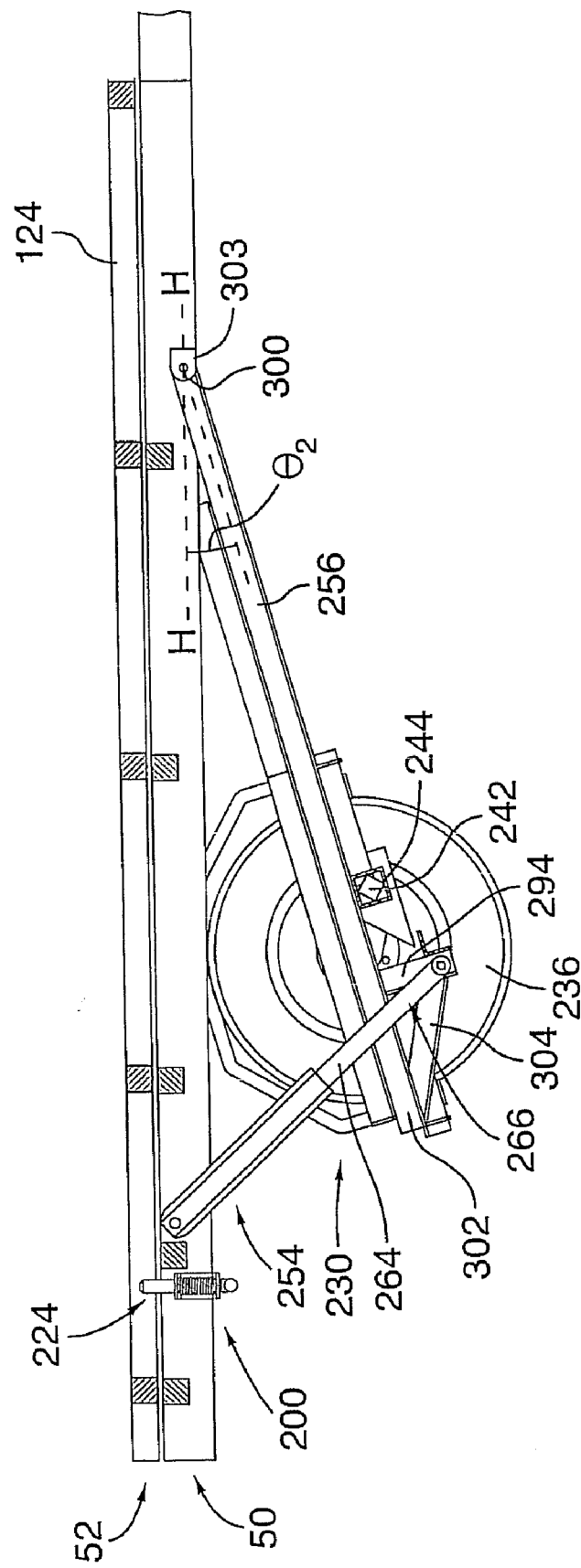
FIG. 12A is an enlarged partial cross-sectional view of the boat trailer shown in FIG. 11 taken along line "12A-12A"
Figure 12B:
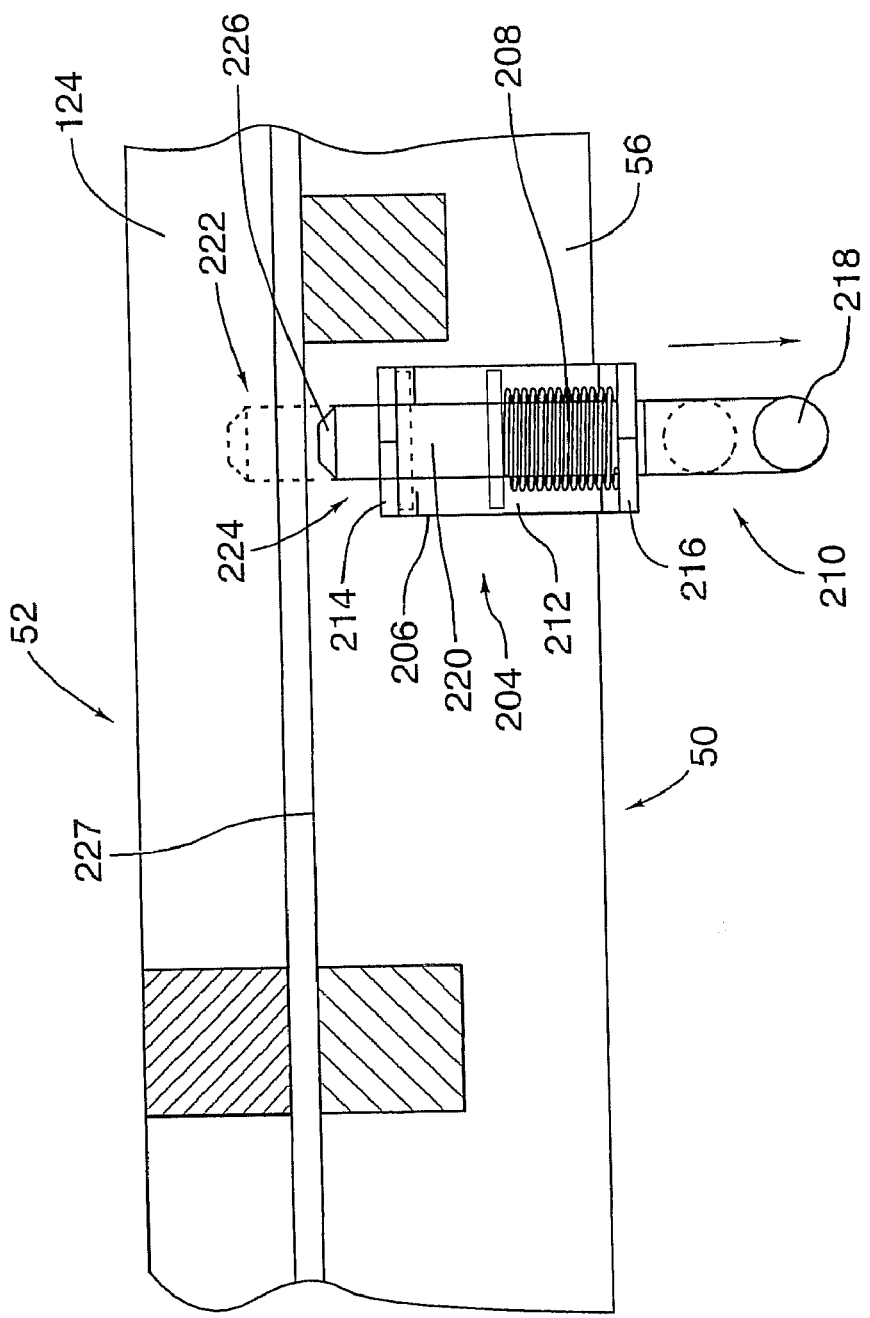
FIG. 12B is an isolated side elevation view of the locking assembly illustrated in FIG. 12A showing the locking pin moved to its retracted, non-locking position to permit rotation of the upper rotatable carousel frame portion of the support frame assembly relative to the lower base frame portion thereof.

Referring to FIGS. 12A and 12B, each locking assembly 202, 204 includes a generally C-shaped bracket 206, and a spring member in the nature of a coil spring 208 and a locking bar 210 retained within the bracket 206. The bracket 206 has a back portion 212 and a pair of opposed, apertured, upper and lower arm portions 214 and 216. The back portion 212 of the bracket 206 is fastened to the inner face of the side sill 122, 124 with the bracket 206 vertically oriented. The coil spring 208 is retained between the upper and lower arm portions 214 and 216 with its longitudinal axis aligned with the apertures defined in the arm portions 214 and 216. The locking bar 210 is an L-shaped bar provided with a relatively short handle portion 218 and a relatively long spring-engaging portion 220 oriented substantially perpendicular to the handle portion 218. The long portion 220 is mounted to extend through the lower arm portion 216, the coil spring 208 and the upper arm portion 214.

The locking bar 210 is movable between a locked, fully extended, position 222 (shown in FIG. 12A) and an unlocked, retracted position 224 (shown in 15B). When in the locked position 222, the terminal end 226 of the locking bar portion 220 projects above the uppermost edge 227 of the base frame portion 50 to thereby prevent rotation of the carousel frame portion 52 relative to the base frame portion 50. To prevent undesired rotation of the carousel frame portion 52, the locking assemblies 202 and 204 are designed so that the locking bars 210 are biased in their respective locked positions 222 by the action of coil springs 208. When in the unlocked position 224, the locking bar portion 220 is retracted against the force of the coil springs and the terminal end 226 of the locking bar portion 220 is lowered below the uppermost edge 227 of the base frame portion 50 so as to prevent any interference with the carousel frame portion 52. An aperture (not visible) defined in the locking bar portion 220 is adapted to receive a cotter pin or other means for maintaining the locking bar 210 in the unlocked position 224.

While it is generally preferred for safety reasons that the locking or rotation preventing means include two locking assemblies—one locking assembly associated with side sill 122 and another locking assembly associated with side sills 124—this need not be the case in every application. In an alternative embodiment, a single locking assembly could be provided. In another embodiment, the one or more locking assemblies could be disposed at different locations on the support frame assembly (i.e. carried on structural members of the base frame portion other than the side sills, or carried on structural members of the carousel frame portion). In still other embodiments, the locking or rotation preventing means could take a different form.

The base frame portion 50 is also provided with an attachment fitting (not shown) for a garden-hose type connection at the crossbar 172. This fitting allows a garden hose to be connected to the base frame portion 50 and fresh water to flow from the hose into the hollow side sills 122 and 124. The fresh water can fill the hollow of the side sills thereby displacing any sea water which may have accumulated therein through drain plugs located on the underside of the side sills 122 and 124 adjacent the rear ends thereof. In this way, residual seawater from within the hollows of the side sills 122 and 124 may be flushed out so as to prevent corrosion of the base frame portion 50.

In the embodiment shown in FIG. 7, the base frame portion 50 is symmetrical about a longitudinal centerline $CL_3$ such that the arrangement of side sill 122, and cross-members 126*a* 126*b*, 126*c* and 128*d* is a mirror image of the arrangement of side sill 124, cross-members 126*a* 126*b*, 126*c* and 128*d*. In other embodiments, the base frame portion could be designed to be asymmetrical about the longitudinal centerline $CL_3$.

The wheel assembly 36 and the support frame lifting assembly 40 are now described in greater detail with reference to FIGS. 7, 8A and 8B. The wheel assembly 36 includes a first wheel subassembly 230 located adjacent the side sill 124, a second wheel subassembly 232 disposed opposite the first wheel subassembly 230 and located adjacent the side sill 122, and an axle subassembly 234 connecting the first wheel subassembly 230 to the second wheel subassembly 234. The wheel assembly 36 is also provided with a first fender assembly 250 associated with the first wheel subassembly 230 and a second fender assembly 252 associated with a second wheel subassembly 232.

Each wheel subassembly 230, 232 includes a wheel hub 233 provided with a cylindrical axle-receiving portion 234 and a tire 236 fitted onto the wheel hub 233. The axle-receiving portion 234 has a bore (not visible) and a bearing assembly (not visible) mounted in surrounding relation to the bore. One end of a stub axle 238 is received within the bore defined in the axle-receiving portion 234, while the opposite end thereof is connected to a portion of the axle subassembly 234.

The axle subassembly 234 includes a main axle 242 (best shown in FIG. 9), a protective axle housing 244 encasing the main axle 242, a first linkage plate 246 for connecting the main axle 242 to the stub axle 238 of the first wheel subassembly 230 and a second linkage plate (not visible) for connecting the main axle 242 to the stub axle 238 of the second wheel subassembly 232. The first linkage plate 246 has a generally oblong shape and is provided with two apertures—one aperture (not visible) is circular and receives a portion of the stub axle 238 of the first wheel subassembly 230 and the other aperture (not visible) is square and receives one end of the main axle 242. The second linkage plate is configured similar to the first linkage plate 246. It has two apertures, one of which receives a portion of the stub axle 238 of the second wheel subassembly 230, while the other aperture (not visible) receives the opposite end of the main axle 242.

As shown in FIG. 9, the main axle 242 is a solid bar with a generally diamond-shaped profile. It is retained within the box-like axle housing 244 formed from a section of HSS of square cross-section. It should be appreciated that the axle housing 244 serves a dual purpose. First, it protects and reinforces the main axle 242 and provides increased rigidity to the axle subassembly 234. Second, as explained in greater detail below, it serves as an attachment point for the support frame lifting assembly 40 and the first and second fender assemblies 250 and 252 associated with the first and second wheel subassemblies 230 and 232, respectively.

While the wheel assembly 36 shown in the drawings includes a single pair of wheels 236, it should be appreciated that in other embodiments, the wheel assembly could be configured to have a double pair of wheels arranged in tandem with a corresponding number of fender assemblies. In still other embodiments, the wheel assembly could be provided with more pairs of wheels.

Referring to FIGS. 8A, 8B, 9 and 11, the support frame lifting assembly 40 includes a first hydraulic piston 254, a first pivot arm 256, a second hydraulic piston 258 and a second pivot arm 260. Each hydraulic piston 254, 258 includes a piston cylinder 262 and a piston rod 264 mounted within the piston cylinder 262 moveable between an extended position 266 (shown in FIG. 10) and a retracted position 268 (shown in FIG. 9). At one end of the first hydraulic piston 254, the piston cylinder 262 is pivotally attached to a tab 270 fixed to a short crossbar 272. The crossbar 272 itself extends between the side sill 124 and a longitudinal stringer 274 mounted between the rear cross-member 126b and the second interior cross-member 126d. At the opposite end of the first hydraulic piston 254, the distal end 274 of the piston rod 264 is pivotally connected to the axle housing 244 by a pivot pin 276. The pivot pin 276 extends between and is retained by a tab 278 and block 280 spaced apart from the tab 278. Both the tab 278 and the block 280 are welded to the axle housing 244. The weld connection between the block 280 and the axle housing 244 is further reinforced by a gusset member 288 welded to the axle housing 244 and the block 280.

The second hydraulic cylinder 258 is similarly mounted with the piston cylinder 262 pivotally attached to a tab 290 fixed to a short crossbar 292. The crossbar 292 extends between the side sill 122 and a longitudinal stringer 294 mounted between the rear cross-member 58b and the second interior cross-member 58d. The distal end of the piston rod 264 belonging to the second hydraulic piston 254 is pivotally connected to the axle housing 244 by a pivot pin (not visible). The pivot pin extends between and is retained by a tab and block arrangement (not visible, but similar to tab 278 and block 280).

The first pivot arm 256 is an HSS section having a front end 300 and a rear end 302. The front end 300 of the pivot arm 256 is pivotally connected to an L-shaped bracket 303 fixed to the inner surface of the side sill 124 adjacent the front extremity 156 of the straight portion 150. The rear end 302 of the pivot arm 256 is welded to an inclined structural member 304 which extends downwardly at an angle to join to the block 280. A straight structural member 294 extends downwardly from the first pivot arm 256 to the block 280 to provide additional reinforcement. At a location closer to the rear end 292 than to the front end 290, the first pivot arm 256 is welded to the axle housing 244.

When the piston rod 264 of the first hydraulic piston 254 is in its retracted position 268, the first pivot arm 256 extends substantially parallel to side sill 124. When the piston rod 264 is in its extended position 266, the first pivot arm 264 is oriented downwardly at an angle $\theta_2$ relative to a horizontal axis H parallel to side sill 124. In this embodiment, the angle $\theta_2$ measures 16 degrees. In other embodiments, a different angle may be used.

The second pivot arm 260 is similar in structure, configuration and geometry to the first pivot arm 256. The front end 305 of the pivot arm 260 is pivotally connected to an L-shaped bracket 306 fixed to the inner surface of the side sill 122 adjacent the front extremity 156 of the straight portion 150. The rear end 308 of the pivot arm 260 is welded to an inclined structural member (not visible, but similar to inclined structural member 304) which extends downwardly at an angle to join to the block connected to pivot pin 276. A straight structural member (similar to straight structural member 294) provides additional reinforcement to the axle housing 244 and the block. At a location closer to the rear end 308 than to the front end, the first pivot arm 260 is welded to the axle housing 244.

In like fashion to the first pivot arm 256, the second pivot arm 260 is substantially parallel to side sill 122 when the piston rod 264 of the second hydraulic piston 258 is in its retracted position 268. When the piston rod 264 is in its extended position 266, the second pivot arm 260 is oriented downwardly at the angle $\theta_2$ relative to the horizontal axis.

To deploy the support frame assembly 34 from the lowered, towing configuration 42 to the raised, rotatable configuration 44, the first and second hydraulic pistons 254 and 258 are actuated to cause each piston rod 264 to move from its respective retracted position 268 (shown in FIG. 9) to its respective extended position 266 (shown in FIG. 12A). As the piston rods 264 extend they alter the position of the support frame assembly 34 relative to the wheel subassemblies 230 and 232, causing on the one hand, the piston cylinders 262 to pivot relative to the base frame portion 50 and on the other hand, the piston rods 264 to pivot relative to the axle housing 244, thereby lifting the rear end of the support frame assembly 34.

Preferably, the support frame lifting assembly 40 employs two paired arrangements of hydraulic pistons and pivot arms. However, it should be appreciated that this need not be the case in every application. For instance, in some embodiments, it may be possible to use only a single piston. In other embodiments, the hydraulic pistons could be replaced in favour of pneumatic pistons. In still other embodiments, the support frame lifting assembly could employ different means altogether. For example, with some modifications, one or more scissor jacks mounted between the axle housing and the base frame portion could be used to raise the support frame assembly. Other mechanical, electrical, hydraulic or pneumatic arrangements could also be used. Further still, it may be possible to configure a boat trailer in accordance with the principles of the present invention wherein only the carousel frame portion is raised to provide clearance over the wheel assembly 36 to thereby allow unimpeded rotation of the carousel frame portion.

Figure 8A:
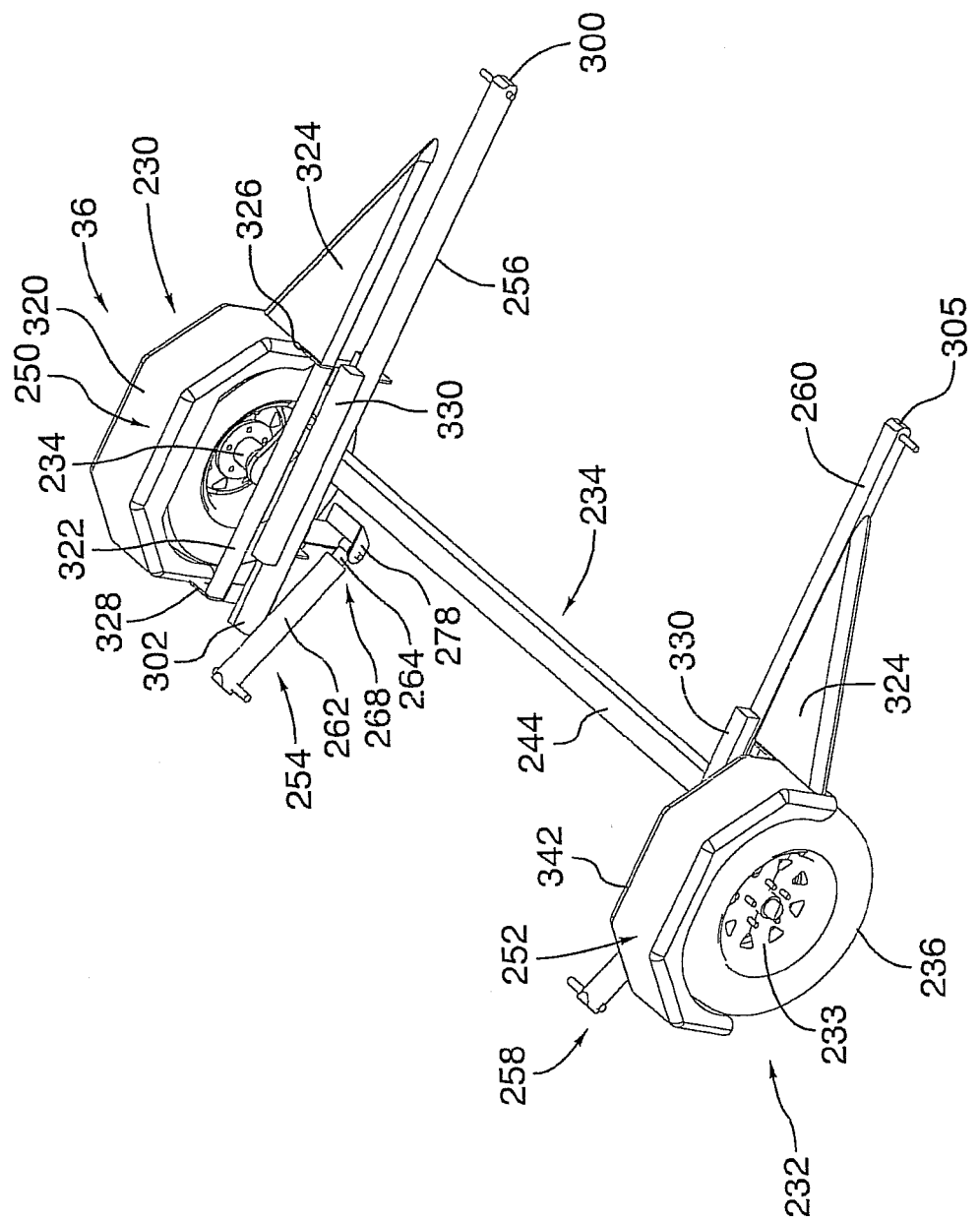
FIG. 8A is a front perspective view of the wheel assembly and the support frame lifting assembly shown in FIG. 7.
Figure 8B:
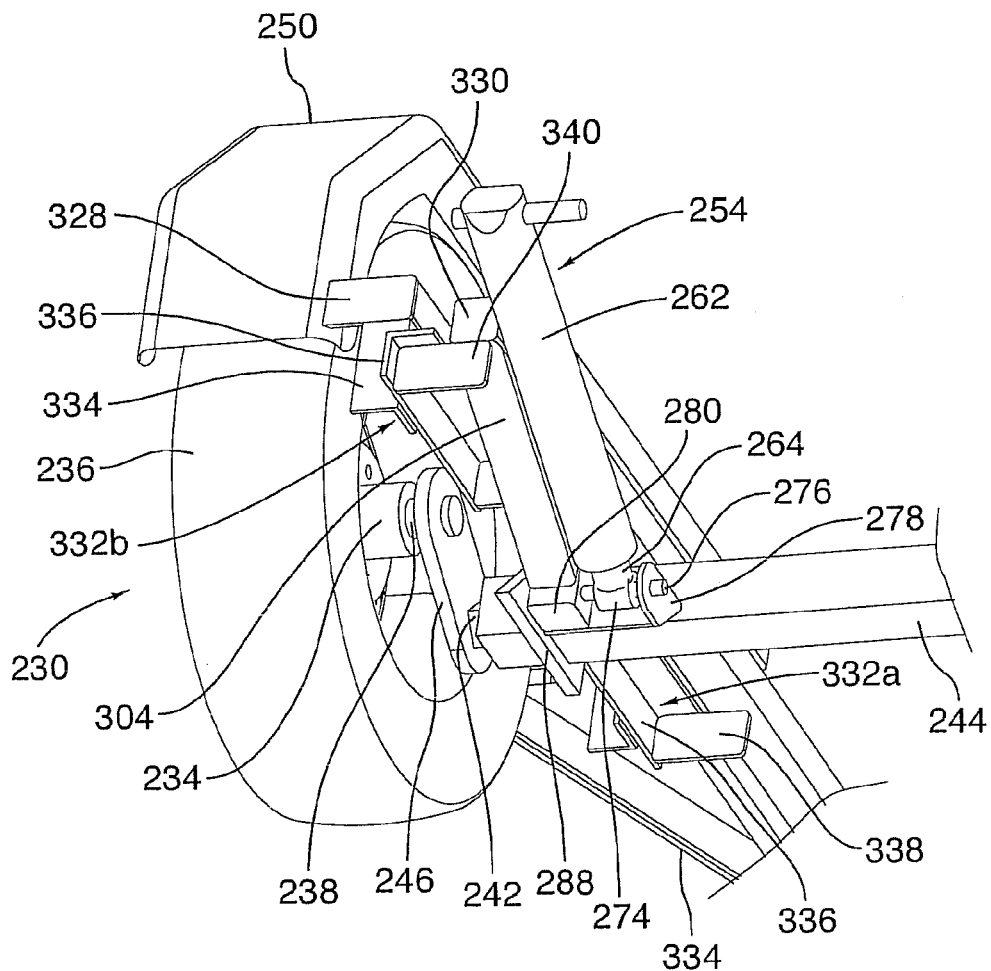
FIG. 8B is a magnified, partial rear bottom perspective view of one of the wheel subassemblies shown in FIG. 8A.

Referring now to FIG. 8A, there are shown the first and second fender assemblies 250 and 252. Each fender assembly 250 and 252 includes a vaguely semi-circular fender member 320 mounted over the wheel subassembly 230, 232 (as the case may be), a mounting crossbar 322 spanning the interior of the fender member 320 and a triangular gusset plate 324 for reinforcing the fender member 320. The mounting crossbar 322 has a front flange 326 (visible in FIG. 8A) welded to the front of the fender member 320 and the back of the gusset plate 324, and a rear flange 328 welded to the rear of the fender member 320. Along its section, the mounting crossbar 322 is welded to a structural reinforcement member 330 which is itself fixed to the upper face of the pivot arm 256, 260.

Each fender assembly 250, 252 is further reinforced with two paired arrangements of angle members—a first pair 332a of angle members mounted to the front flange 326 of the mounting crossbar 322 and a second pair 332b of angle members mounted to the rear flange 328 of the mounting crossbar 322. Each arrangement of angle members 332 includes a vertically oriented angle member 334 and a horizontally oriented angle member 336. The vertically oriented angle member 334 of the first pair 332a is welded to and extends downwardly from the front flange 326. Fixed to one leg of the vertically oriented angle member 334 in a transverse orientation is the horizontally extending angle member 336 of the first pair 332a. A plate 338 ties the horizontally extending angle member 336 of the first pair 332a to structural reinforcement member 330. The vertically oriented angle member 334 and horizontally oriented angle member 336 of the second pair 332b is similarly arranged with the vertically oriented angle member 334 welded to and extending downwardly from the rear flange 328 and the horizontally extending angle member 336 fixed to one leg of the vertically oriented angle member 334 in a transverse orientation relative thereto. A plate 340 ties the horizontally extending angle member 336 of the second pair 332b to the inclined structural member 304.

Having described the structure of the boat trailer 20, an exemplary deployment of the boat trailer 20 will now be described in greater detail below with reference to FIGS. 2A, 3, 9, 10, 11, 12A, 12B and 13 to 17. As a preliminary matter, the boat 22 is disconnected from the winch assembly 180 and the snubbing block 181.

Figure 13:
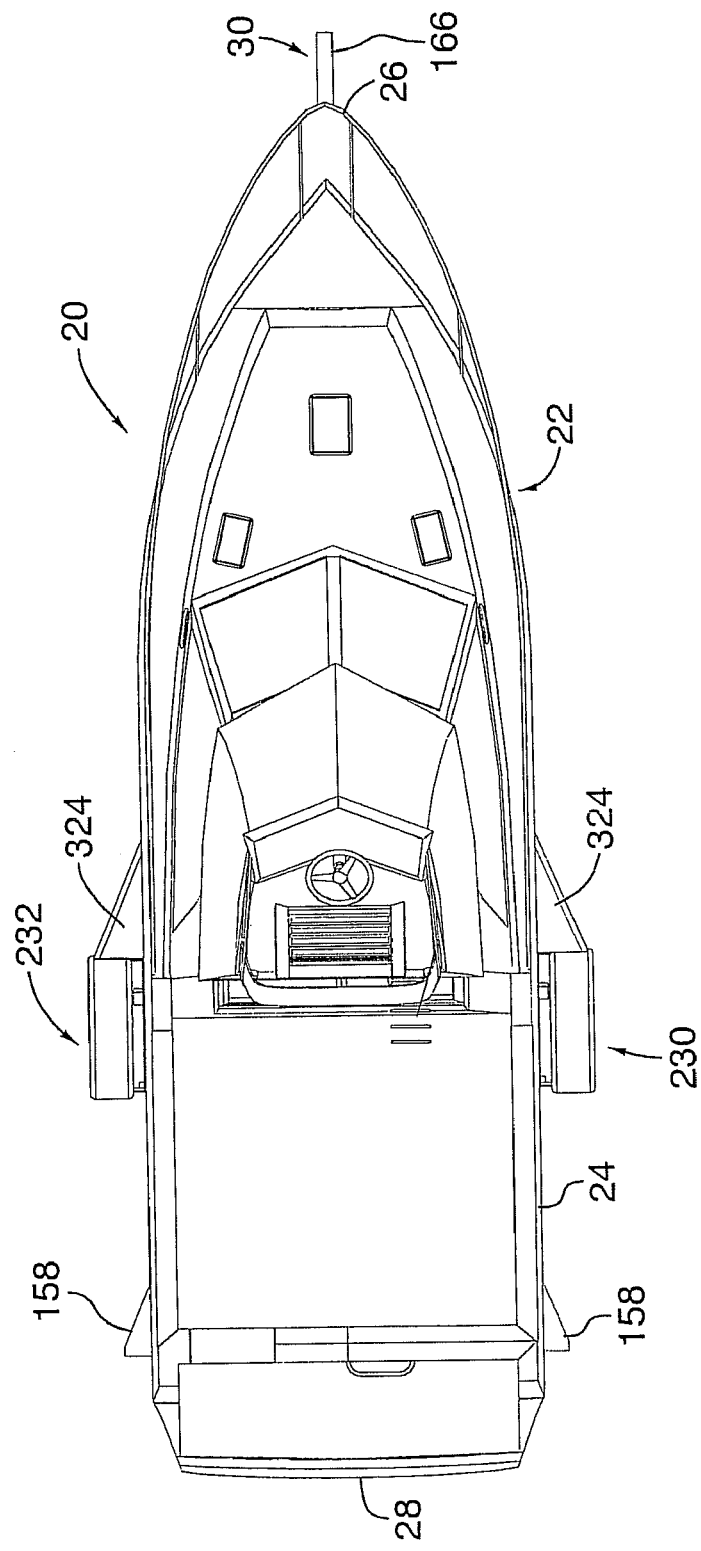
FIG. 13 is a top plan view of the boat trailer and the boat illustrated in FIG. 1 showing the bow of the boat initially oriented toward the front end of the boat trailer.

FIG. 13 shows the boat trailer 20 with the boat 22 carried on the support frame assembly 34 in an initial position with its bow 26 oriented toward the front end 30 of the boat trailer 20. In this position, the support frame assembly 34 is deployed in its lower, towing configuration 42 and is able to support the boat 22 relatively close to the ground for enhanced stability during towing and transport. The carousel frame portion 50 is carried below the uppermost edge 342 of the fender members 320 (see FIGS. 2A and 3) and the piston rods 264 of the hydraulic pistons 254 and 258 are in their respective retracted positions 268 (see FIG. 9). In this embodiment, the lowermost edge 340 of the carousel frame portion 50 is carried at a height of approximately 35 cm above the ground when the support frame assembly 34 is deployed in the lowered configuration 42. In other embodiments, the lowermost edge could be carried at a different height.

The snubbing block 181 is retracted away from the hull 24 so as to allow unobstructed rotation of the carousel frame portion 52 about the base frame portion 50. To reorient the boat 22 bow-first, the support frame lifting assembly 40 is first actuated in order to raise the carousel frame portion 50 over the fender members 320. More specifically, the first and second hydraulic pistons 254 and 258 are actuated to cause the piston rods 264 to move to their respective extended positions 266. As the piston rods 264 extend they cause the rear end 30 of the boat trailer 20 to lift away from the wheel assembly 36 and the fender assemblies 250 and 252. In this position, the lowermost edge 340 of the carousel frame portion 50 is carried above the uppermost edge 342 of the fender members 320, when the support frame assembly 34 is deployed in the raised configuration 44.

Actuation of the support frame assembly 40 can be done while the boat trailer 20 is still hitched to the towing vehicle. In this case, the rear end 32 of the boat trailer 20 will be carried higher off the ground than the front end 30 of the boat trailer 20. Alternatively, the boat trailer 20 can be uncoupled from the towing vehicle and the auxiliary wheel assembly 174 may be deployed to lower the wheel 178 onto the ground and also raise the front end 30 of the boat trailer 20 so that it is carried at the same height as the rear end 32, as is shown in FIG. 10.

Next, the locking means 200 preventing the rotation of carousel frame portion 52 relative to the base frame portion 50 is released by moving the locking bars 210 of the first and second locking assemblies 202 and 204 to their respective unlocked, retracted positions 224 (shown in 15B). The locking bars 210 are then secured in their retracted positions 224 by inserting a cotter pin into an aperture defined in the locking bar 210. With the locking means 200 released, the carousel frame portion 52 is free to rotate relative to the base frame portion 50.

Preferably, the carousel frame portion 52 is rotated using the winch assembly 182. More specifically, the winch cable 185 is drawn along the port side of the hull 24 and tied to the stern 28 of the boat 22 such that when a length of cable is taken up on the spool 184, the boat 22 (along with the carousel frame portion 52) is urged to rotate in the clockwise direction. In an alternative embodiment, rotation of the carousel frame portion 52 may be effected manually by pushing against the port side of the hull 24 near the bow 26.

Figure 14:
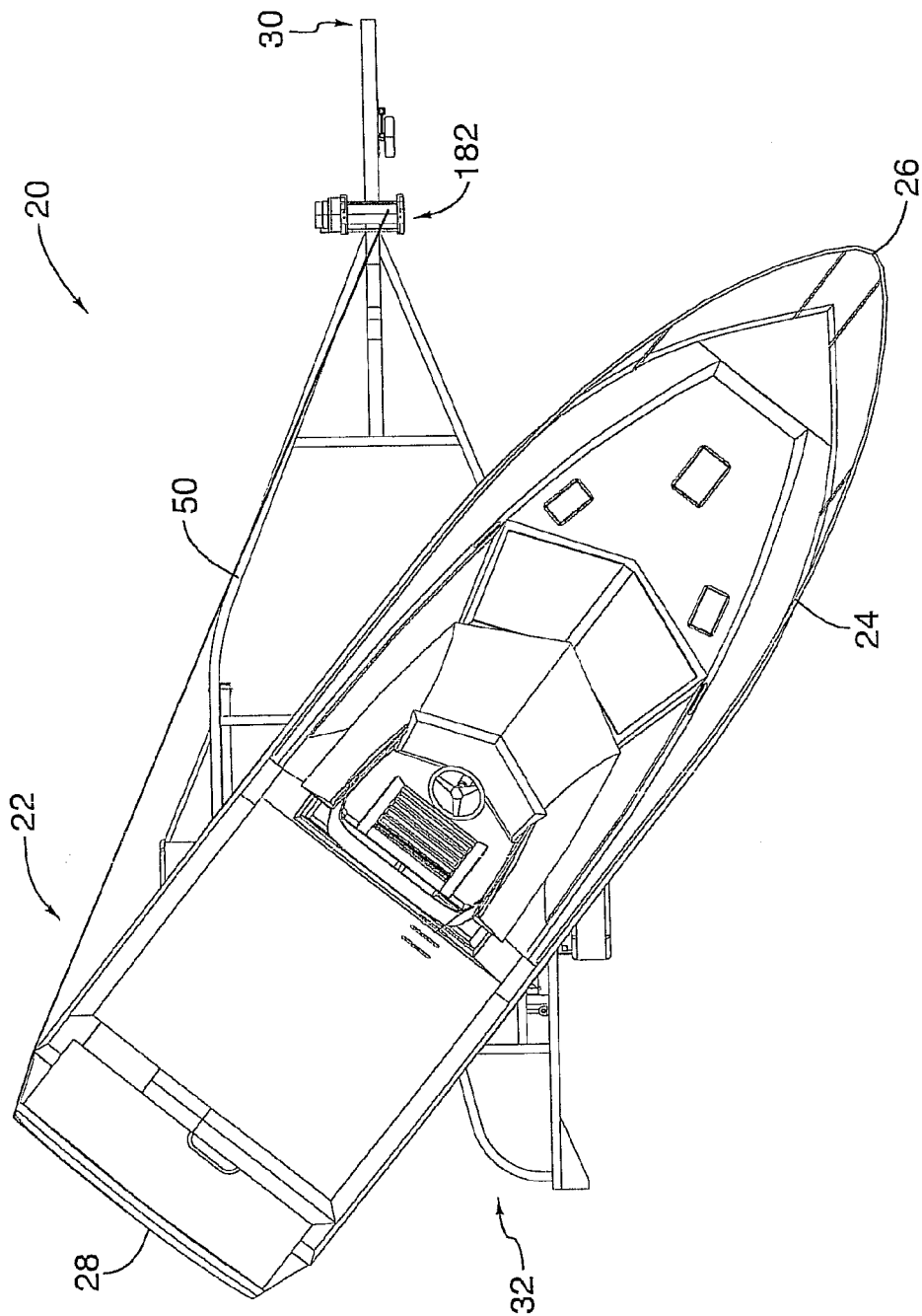
FIG. 14 is a top plan view similar to that illustrated in FIG. 13, except that the bow of the boat is shown oriented at a 45 degree angle relative to the front end of the boat trailer as the upper carousel frame portion of the support frame assembly is rotated relative to the lower base frame portion thereof.
Figure 15:
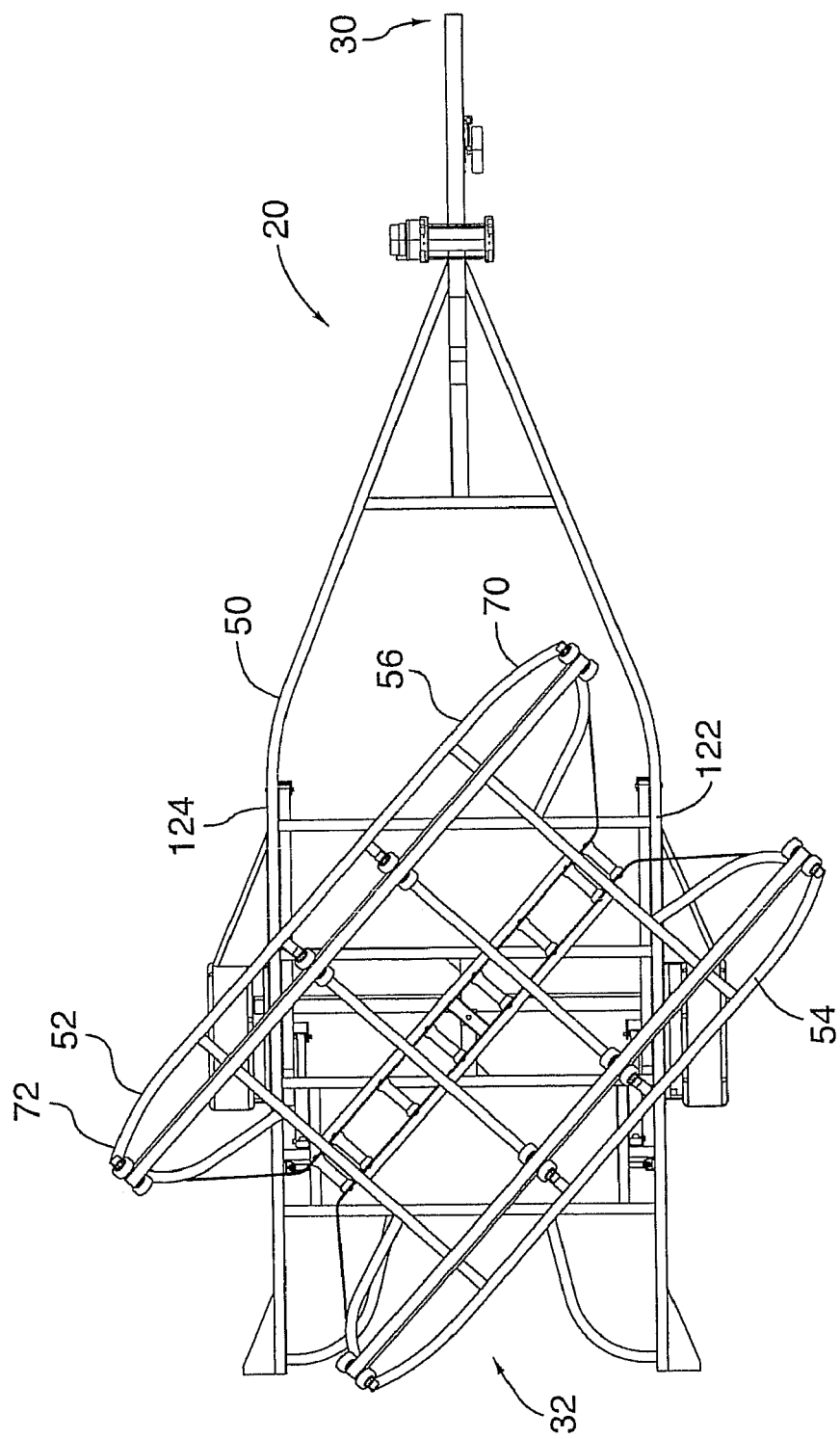
FIG. 15 is a top plan view of the boat trailer of FIG. 14 shown in isolation.
Figure 16:
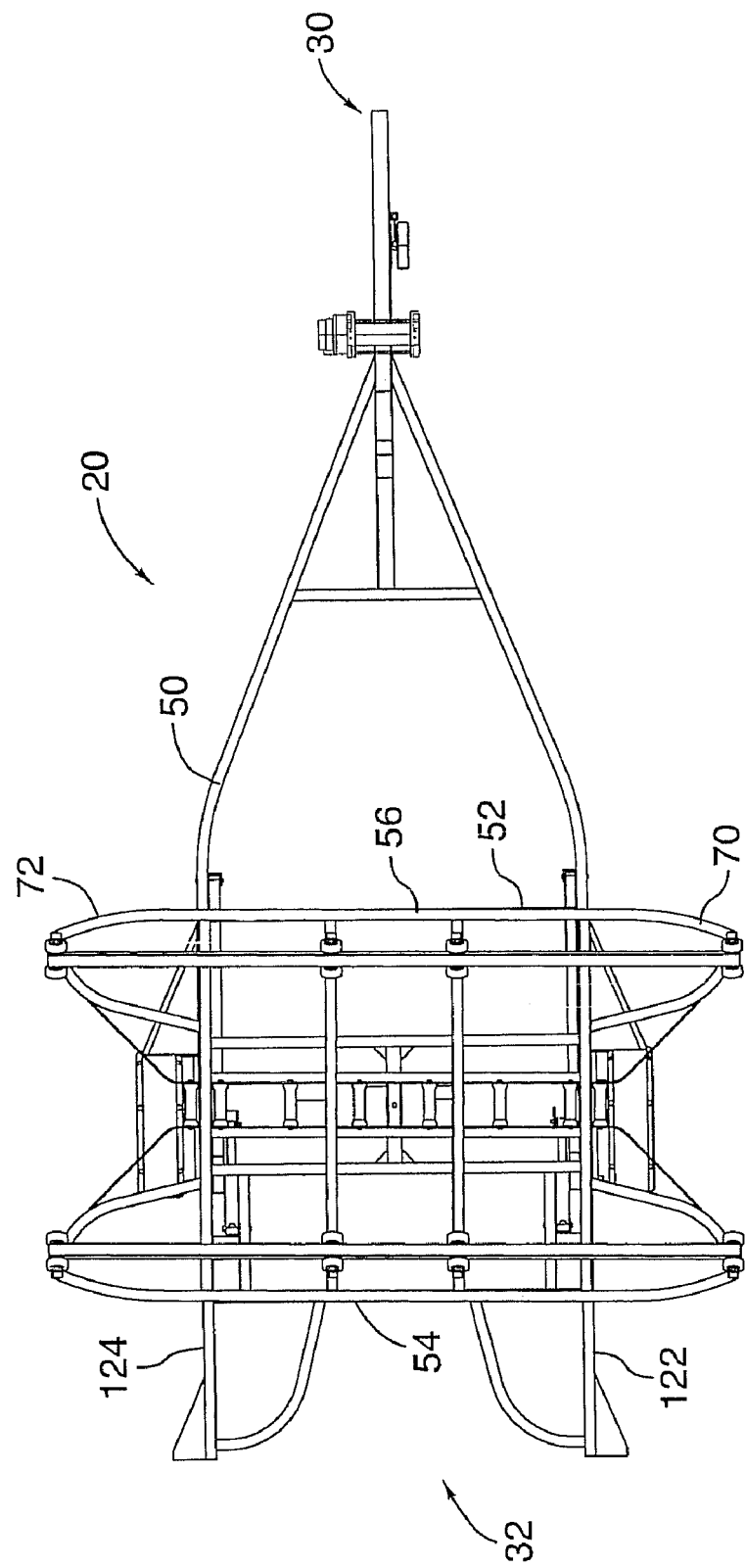
FIG. 16 is a top plan view similar to that illustrated in FIG. 15, except that the upper carousel frame portion of the support frame assembly is shown rotated 90 degrees relative to the lower base frame portion thereof.
Figure 17:
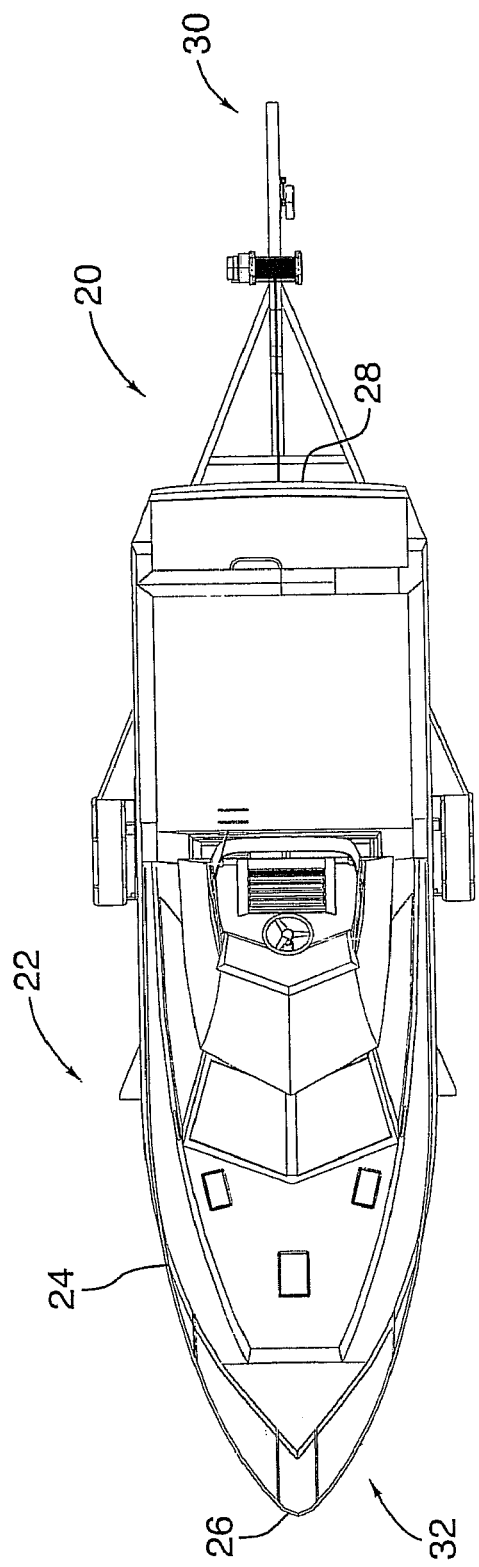
FIG. 17 is a top plan view similar to that illustrated in FIG. 13, except that the bow of the boat is now shown oriented toward the rear end of the boat trailer to facilitate launching the boat bow-first into water.
Figure 18:
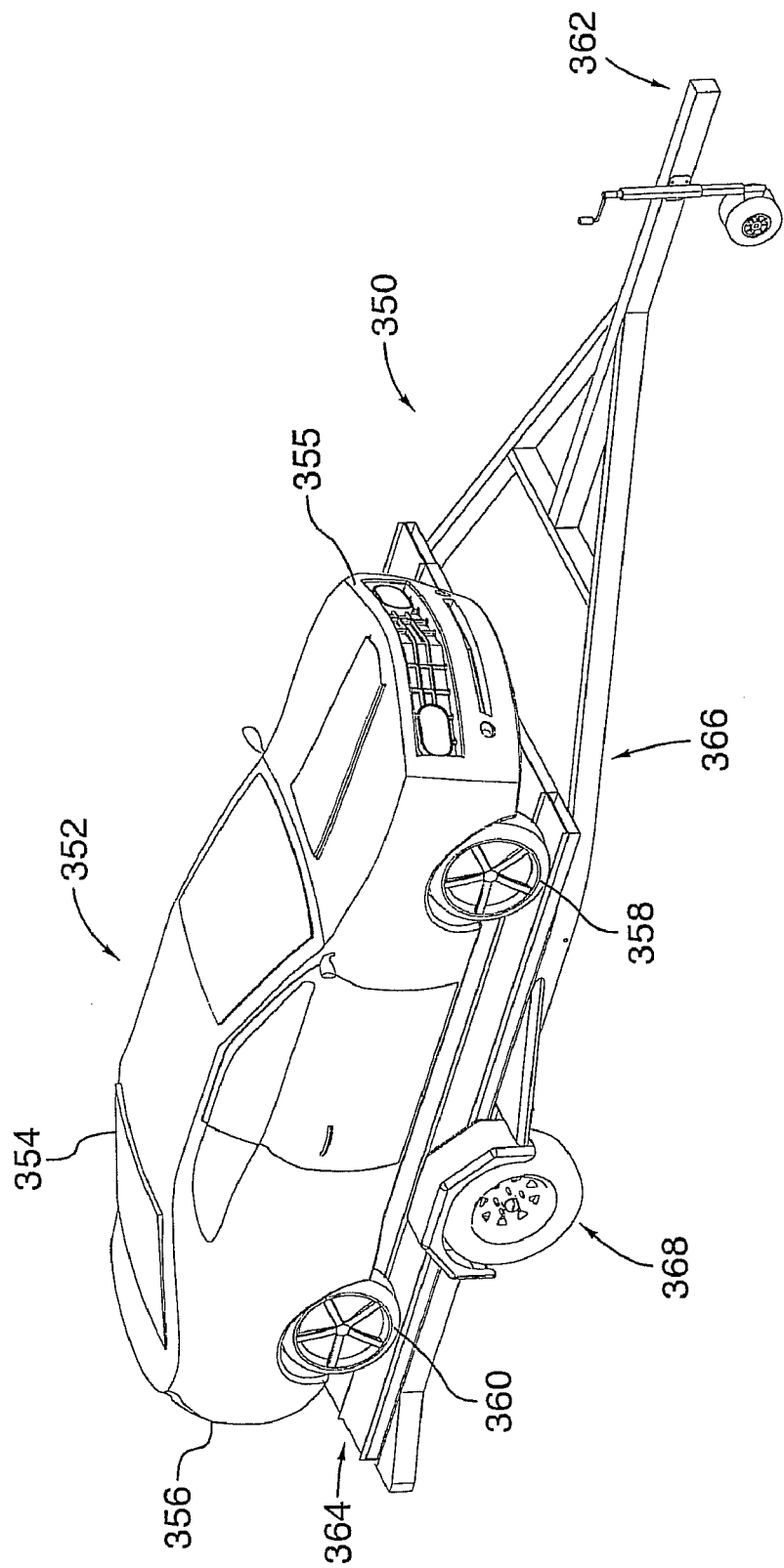
FIG. 18 is a top front perspective view of a vehicle trailer carrying a car on a support frame assembly in accordance with another embodiment of the invention, the support frame assembly shown disposed in its lowered, towing configuration.

FIGS. 14 to 17 show the sequence of rotation of the boat 22 on the carousel frame portion 52. In FIG. 14, the boat 22 is shown partially rotated with the bow 26 of the boat 22 oriented at 45 degrees from the longitudinal axis of the boat trailer 22. In FIG. 15, the boat 22 has been removed to illustrate the position of the carousel frame portion 52. FIG. 16 shows the carousel frame portion 52 oriented at 90 degrees from the longitudinal axis of the boat trailer 20. Finally, FIG. 17 shows the boat 22 (and the carousel frame portion 52) rotated 180 degrees from the initial position with the bow 26 of the boat 22 now oriented toward the rear end 32 of the boat trailer 20. In this final position, the support frame lifting assembly 40 is actuated to deploy the support frame assembly 34 from its raised configuration 44 to its lowered configuration 42. Thereafter, the boat 22 may be launched bow-first into the water from the rear end 32 of the boat trailer 20.

From the foregoing, it will thus be appreciated that the boat trailer 20 readily lends itself to a bow-first launching of a trailered boat, irrespective of the way in which the boat is first positioned onto the boat trailer and despite the fact that it is carried on the support frame assembly relatively low to the ground. This may be achieved even while the boat trailer is attached to a tow vehicle. Moreover, as designed, the boat trailer 20 is capable of receiving a significantly sized trailerable boat from the water bow-first and further re-launching that boat subsequently either bow-first or stern-first as required. Re-launching of the boat bow-first can be achieved without a great deal of effort or without the boat trailer 20 ever having been disconnected. In rough surf, as it frequently encountered, the wave cutting nature of the bow when the boat is at little speed provides sufficient stability for the initial movement out through the waves. This boat trailer tends to be versatile and is operable to launch boat 22 under various field conditions in a relatively safe manner.

The foregoing description relates to a boat trailer constructed in accordance with the principles of the present invention. However, it should be appreciated that the present invention is not limited to boat trailers. The principles of the present invention could be applied to similar advantage to construct other types of trailers, for instance, vehicle trailers. An example of such a vehicle trailer is shown in FIGS. 18 to 25 wherein the vehicle trailer designated generally with reference numeral 350 is shown carrying a car 352. Although, in other embodiments, with minor modifications, the vehicle trailer 350 could be used to carry other vehicles, such as all terrain vehicles (ATVs), snowmobiles, or the like.

The car 352 has a body 354 which includes a front end 355 and a rear end 356. The body 354 is supported by two pairs of wheels 358 and 360 mounted in tandem. The first pair of wheels 358 is mounted adjacent the front end 355 of the car 352 while the second pair 360 is mounted near the second end 356.

Figure 19:
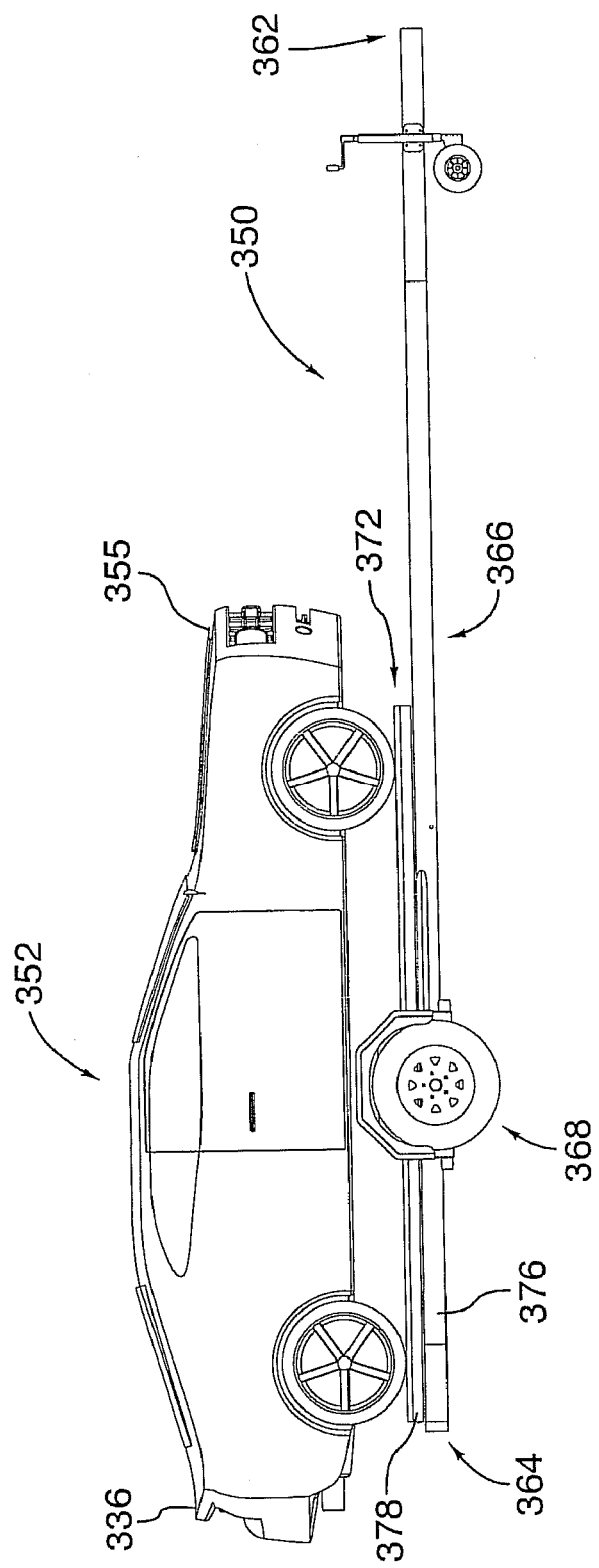
FIG. 19 is a side elevation view of the vehicle trailer and the car shown in FIG. 18.
Figure 20:
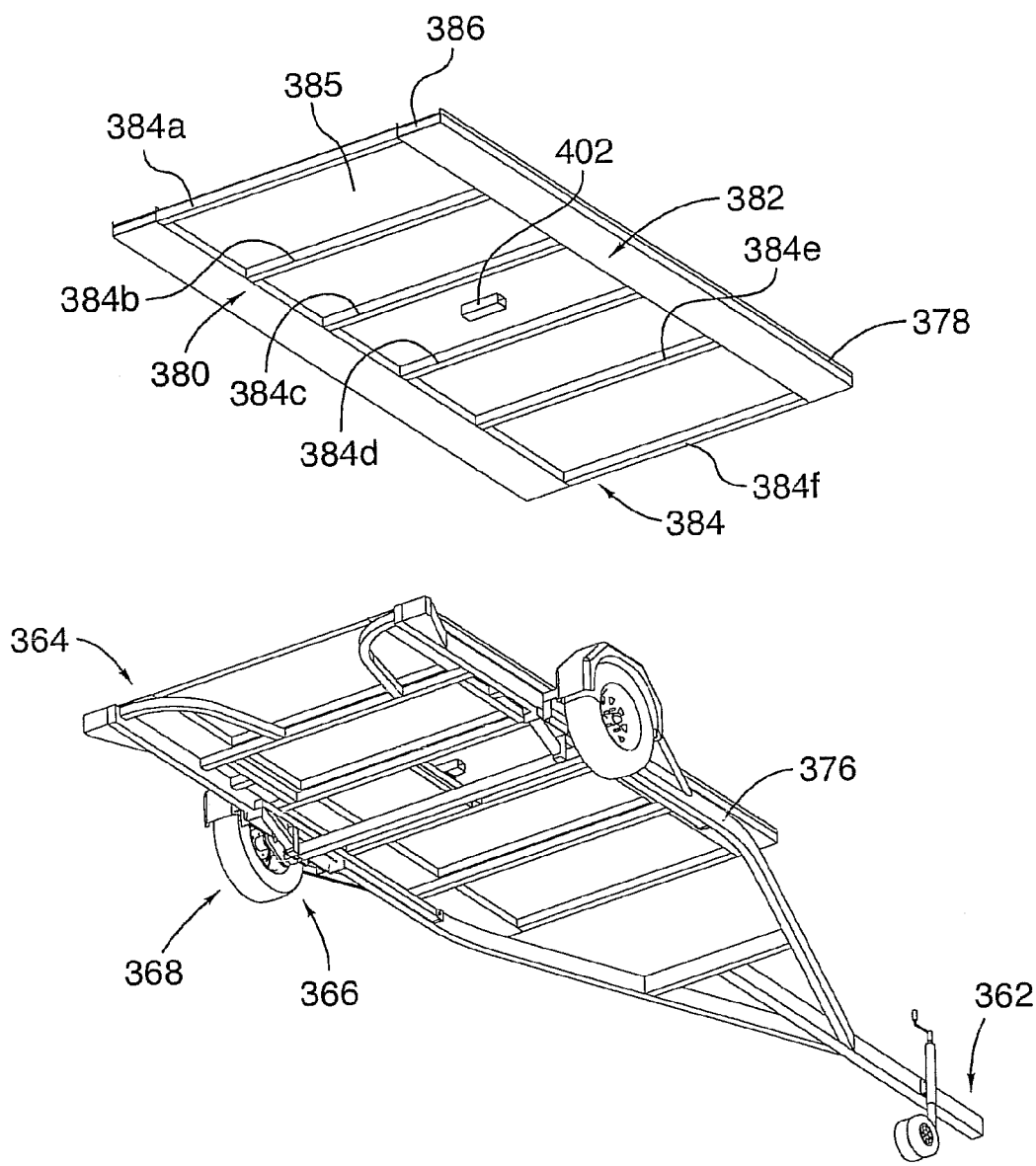
FIG. 20 is a bottom rear perspective view of the vehicle trailer illustrated in FIG. 18 showing the upper rotatable carousel portion of the support frame assembly exploded from the remainder of the vehicle trailer.
Figure 21:
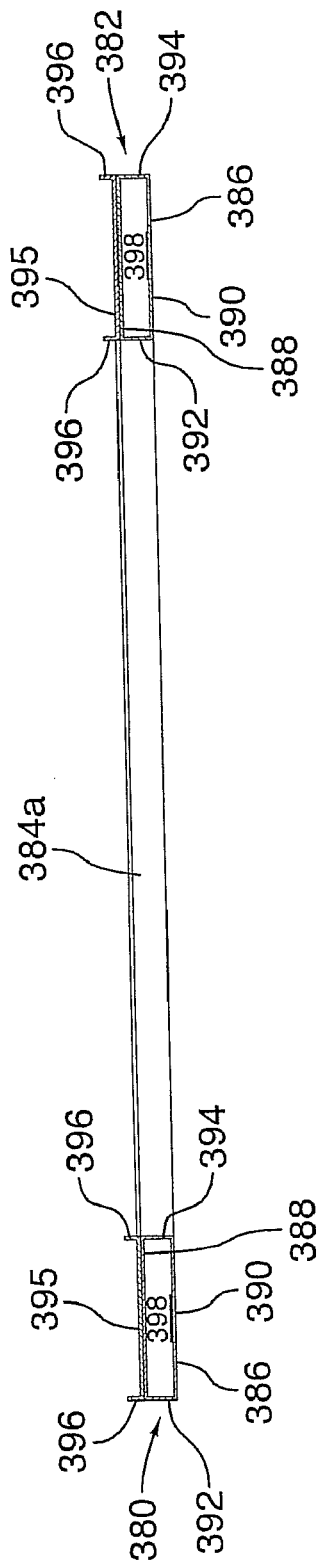
FIG. 21 is a cross-sectional view of the upper carousel portion of the support frame assembly shown in FIG. 20 taken along line "21-21"

The vehicle trailer 350 is generally similar to the boat trailer 20 in structure, function and configuration. It too includes a front end 362, a rear end 364, a support frame assembly 366 extending between the front and rear ends 362 and 364 upon which may be loaded car 352, a wheel assembly 368 for rolling engagement with the ground, and a support frame lifting assembly 370 operable to raise the support frame assembly 366 above the wheel assembly 368. The lifting assembly 370 allows the support frame assembly 366 to be deployed in a lowered, towing configuration 372 (as best shown in FIG. 19) and in a raised, rotatable configuration 374 (as best shown in FIG. 21). As explained in greater detail below, when the support frame assembly 366 is in the raised configuration 374, a portion of the support frame assembly 366 is With specific reference to FIGS. 19 and 20, the support frame assembly 366 resembles the support frame assembly 34 in that it also includes a lower base frame portion 376 and an upper carousel (or turntable) frame portion 378 superimposed on, and pivotally connected to, the base frame portion 376. The base frame portion 376 is similar in all material respects to the base frame portion 50 such that the description of the latter will suffice for the former.

However, the carousel frame portion 378 is configured differently than its counterpart carousel frame portion 50 shown in FIG. 6. In contrast to carousel frame portion 50, the carousel frame portion 378 is configured as a loading platform as opposed to an open framework. More specifically, as shown in FIGS. 20 and 21, the carousel frame portion 378 is made up of two spaced apart, longitudinally extending side sill members 380 and 382, a plurality of cross-members 384 extending between the side sill members 380 and 382 and joining the latter to the former, and a floor panel 385. Each side sill member 380, 382 takes the form of a rectangular box section 386 having an upper wall 388, a lower wall 390 and a pair of spaced apart side walls 392 and 394 extending between the upper and lower walls 388 and 390. Welded to each upper wall 388 is a C-shaped member 395 with its arms 396 oriented upwardly. Each pair of arms 396 forms a track or guide rail for guiding the wheels 358 and 360 of the car 352.

Figure 22A:
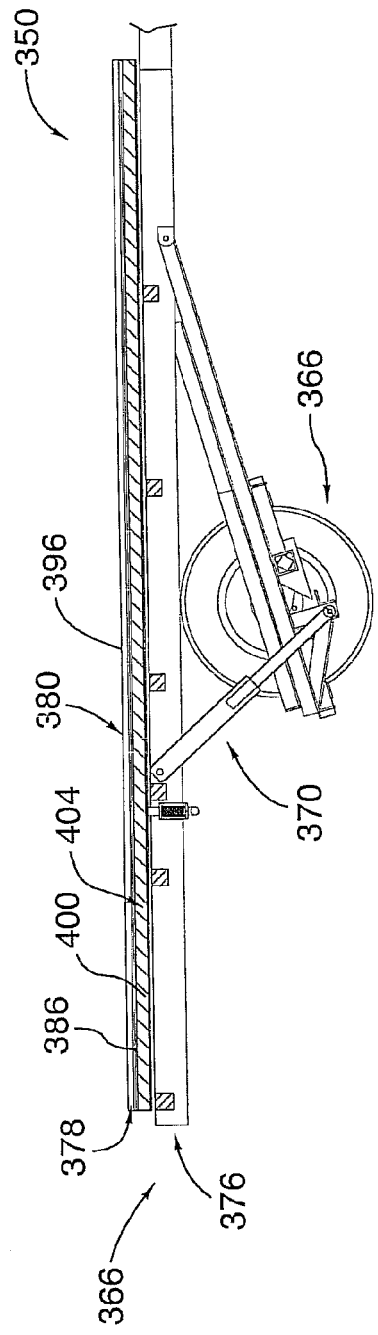
FIG. 22A is an enlarged partial cross-sectional view of the vehicle trailer illustrated in FIG. 20 taken along line "22A-22A" showing the support frame assembly disposed in its raised, rotatable configuration and the ramp members deployed in their respective stowed configurations.
Figure 22B:
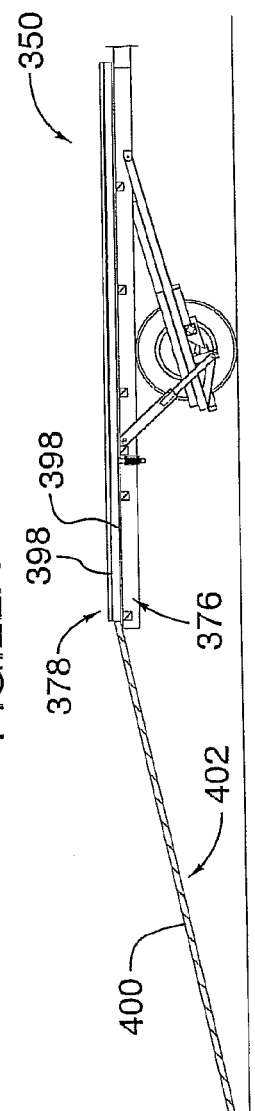
FIG. 22B is an enlarged partial cross-sectional view similar to that illustrated in FIG. 22A showing the support frame assembly disposed in its raised, rotatable configuration and the ramp members deployed in their respective extended configurations.
Figure 22C:
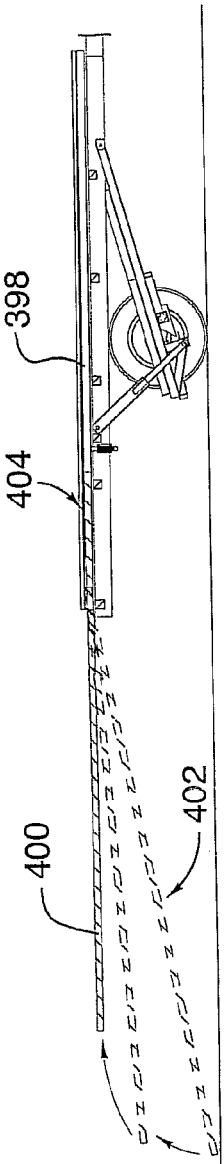
FIG. 22C is an enlarged partial cross-sectional view similar to that illustrated in FIG. 22A showing the support frame assembly disposed in its raised, rotatable configuration and the ramp members being deployed from their respective extended configurations to their respective stowed configurations.

The walls 388, 390, 392 and 394 cooperate with each other to define a space or hollow 398 which are sized to accommodate (or store) ramp members 400 therein. The ramp members 400 may be deployed in an extended, in-use configuration 402 (see FIG. 22B) to facilitate loading and unloading of the car 352 on and off the carousel frame portion 378, and a stowed configuration 404 (see FIG. 22A). When the ramp members 400 are needed they be deployed to their respective extended configurations 402 by pulling them out from the hollow 398 and one end thereof can be placed on the ground while the other end is supported by the box section 386 as shown in FIG. 22B. When the ramp members are no longer needed, they can be stowed in the hollow 398 of the box section 386 (see FIGS. 22C and 22A). Each ramp member 400 is a longitudinal steel plate provided with a treaded friction-enhancing top surface.

In this embodiment, the plurality of cross-members 384 includes six cross-members—first, second, third, fourth, fifth and sixth cross-members 384a, 384b, 384c, 384d, 384e and 384f—arranged in tandem. In other embodiments, a greater or lesser number of cross-members may be used. Each cross-member 384a, 384b, 384c, 384d, 384e, 384f is welded at one end to the side wall 392 of side sill member 380 and at the other end to side wall 394 of side sill member 382.

The floor panel 385 is a checkered structural steel plate which extends the entire length of the carousel frame portion 378. Mounted to the underside of the floor panel 385 is a rectangular, relatively short HSS section 402 which is adapted to receive a pivot pin (not shown) for pivotally connecting the carousel frame portion 378 to the base frame portion 376. In other embodiments, the floor panel 385 could be omitted to reveal an open framework.

The support frame assembly 366 is further provided with means 404 for locking (or preventing rotation of) the carousel frame portion 378 relative to the base frame portion 376 to prevent rotation of the former relative to the latter when the support frame assembly 366 is in its raised, rotatable configuration 374. Locking means 404 is similar to locking means 200 described above.

The wheel assembly 368 is similar in all material respects (i.e. structure, function and configuration) to the wheel assembly 36 described above in that it too includes a first wheel subassembly 410, a second wheel subassembly 412, an axle subassembly 414 connecting the first wheel subassembly 410 to the second wheel subassembly 412, a first fender assembly 416 associated with the first wheel subassembly 410 and a second fender assembly 418 associated with a second wheel subassembly 412.

The support frame lifting assembly 370 is also similar in all material respects (i.e. structure, function and configuration) to its counterpart assembly 40 described above such that no additional description is required.

Figure 23:
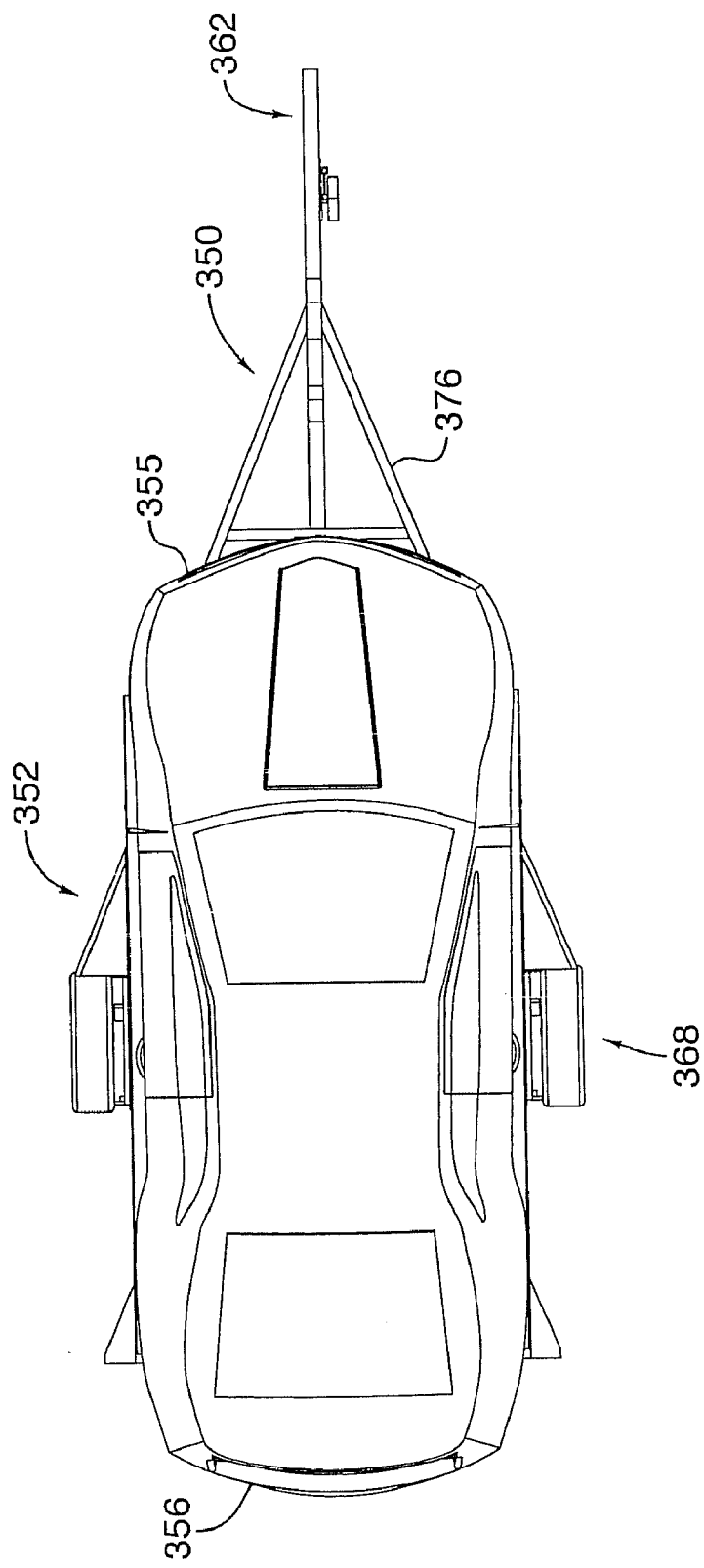
FIG. 23 is a top plan view of the vehicle trailer and the car illustrated in FIG. 18 showing the front of the car oriented toward the front end of the vehicle trailer.

Deployment of the vehicle trailer 350 is similar to that of boat trailer 20. FIG. 23 shows the vehicle trailer 350 with the car 352 carried on the support frame assembly 366 in an initial position with the front end 355 of the car body 354 oriented toward the front end 362 of the vehicle trailer 352. In this position, the carousel frame portion 378 is deployed in its lower, towing configuration 372 and is able to support the car 352 relatively close to the ground for enhanced stability during towing and transport. The carousel frame portion 378 is carried below the uppermost edge 420 of the fender assemblies 416 and 418 (i.e. the uppermost edge of fender members 422, see FIG. 19).

To reorient the car 352 front end-first, the support frame lifting assembly 370 is first actuated in order to raise the carousel frame portion 378 over the fender members 422. Actuation of the lifting assembly 370 is carried out in the same manner as described above in the context of the lifting assembly 40. The rear end 364 of the vehicle trailer 350 is lifted away from the wheel assembly 368 and the fender assemblies 416 and 418. In this position, the lowermost edge 424 of the carousel frame portion 378 is carried above the uppermost edge 420 of the fender members 422. Thereafter, the locking means 404 is released (in the same manner as locking means 200 described above) to allow the carousel frame portion 378 to rotate relative to the base frame portion 376. Rotation of the carousel frame portion 378 may be performed in much the same manner as described above in the context of carousel frame portion 52.

Figure 24:
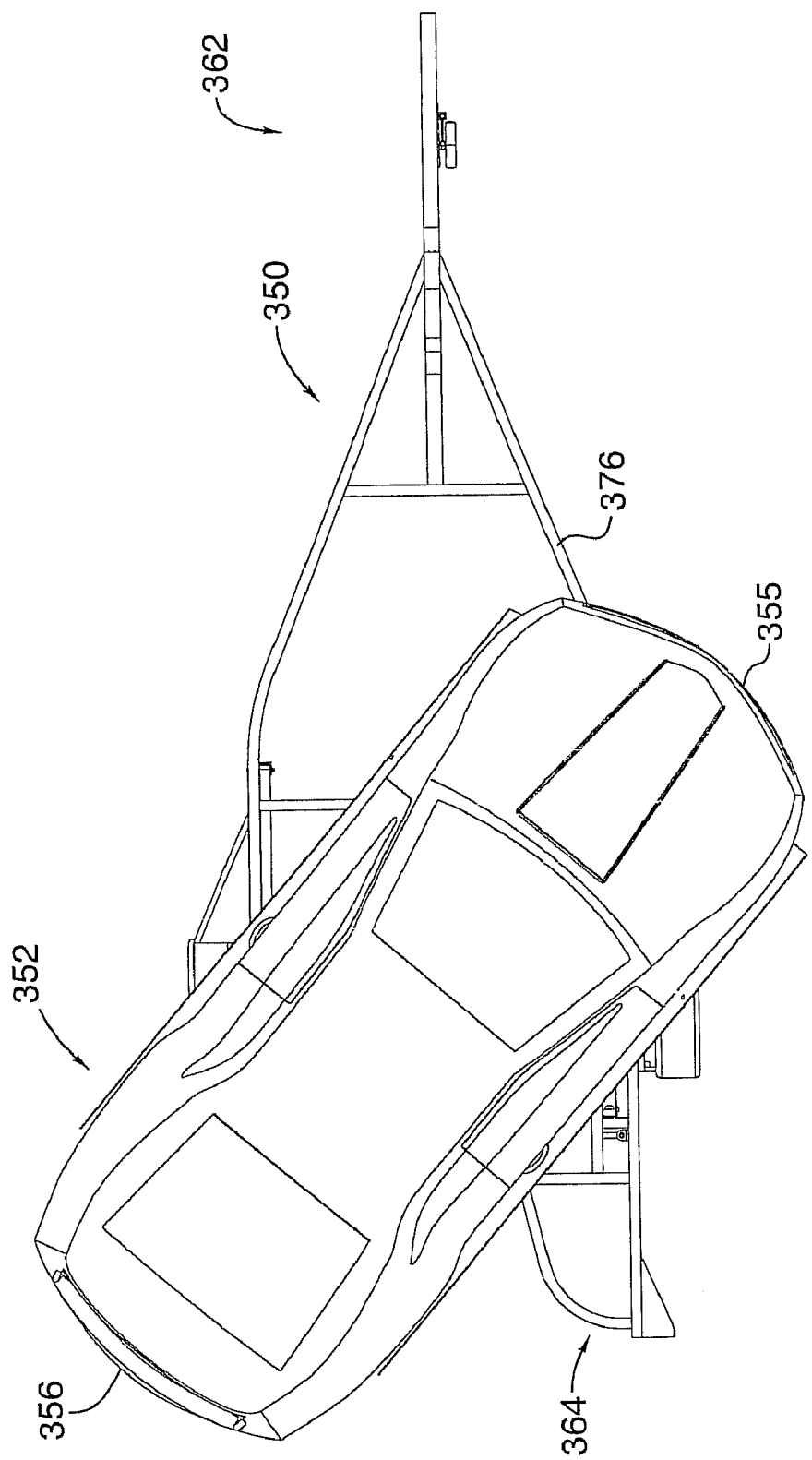
FIG. 24 is a top plan view similar to that illustrated in FIG. 23, except that the front of the car is shown oriented at a 45 degree angle relative to the front end of the vehicle trailer as the upper carousel frame portion of the support frame assembly is rotated relative to the lower base frame portion thereof.
Figure 25:
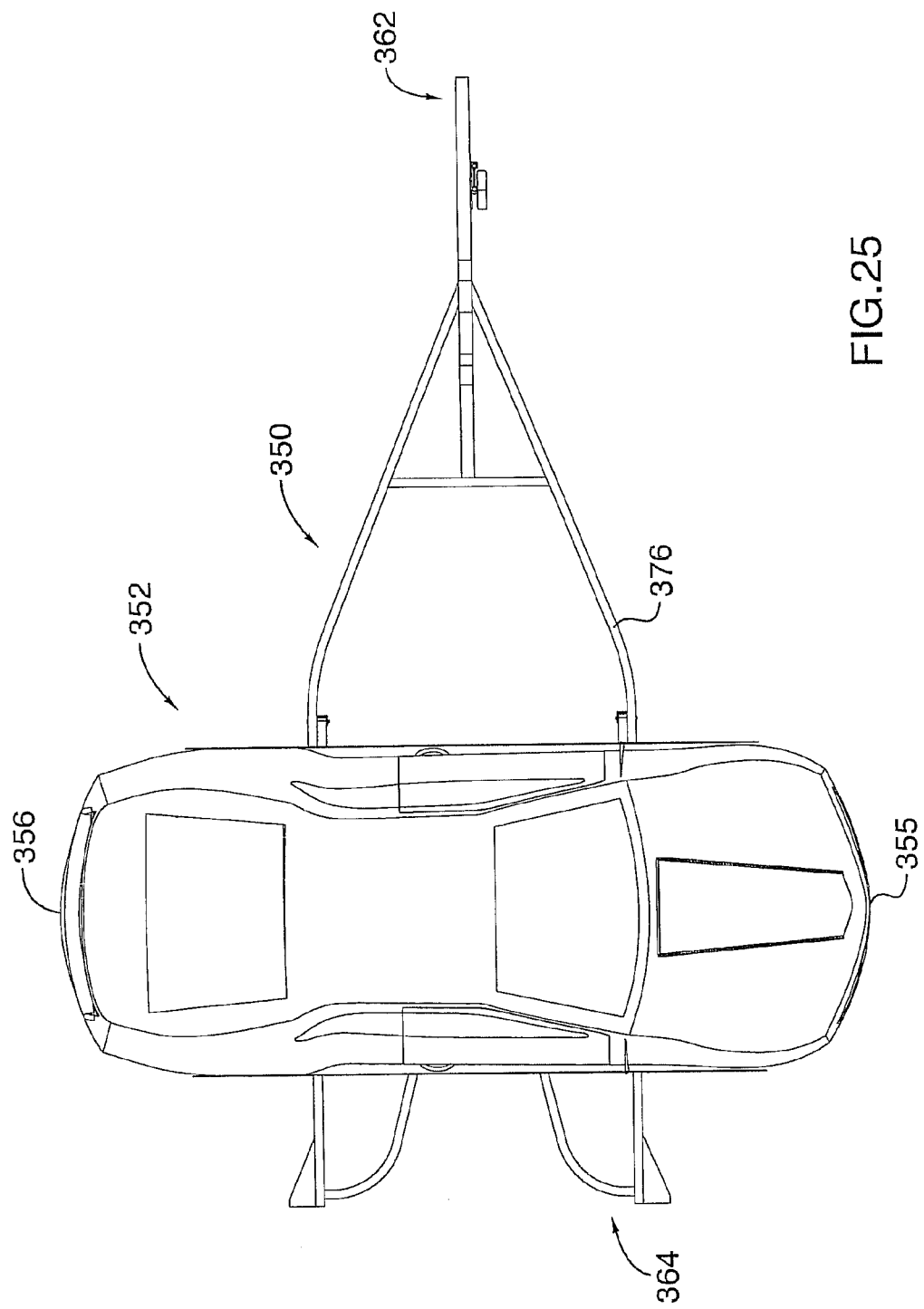
FIG. 25 is a top plan view similar to that illustrated in FIG. 23, except that the upper carousel frame portion of the support frame assembly is shown rotated 90 degrees relative to the lower base frame portion thereof.
Figure 26:
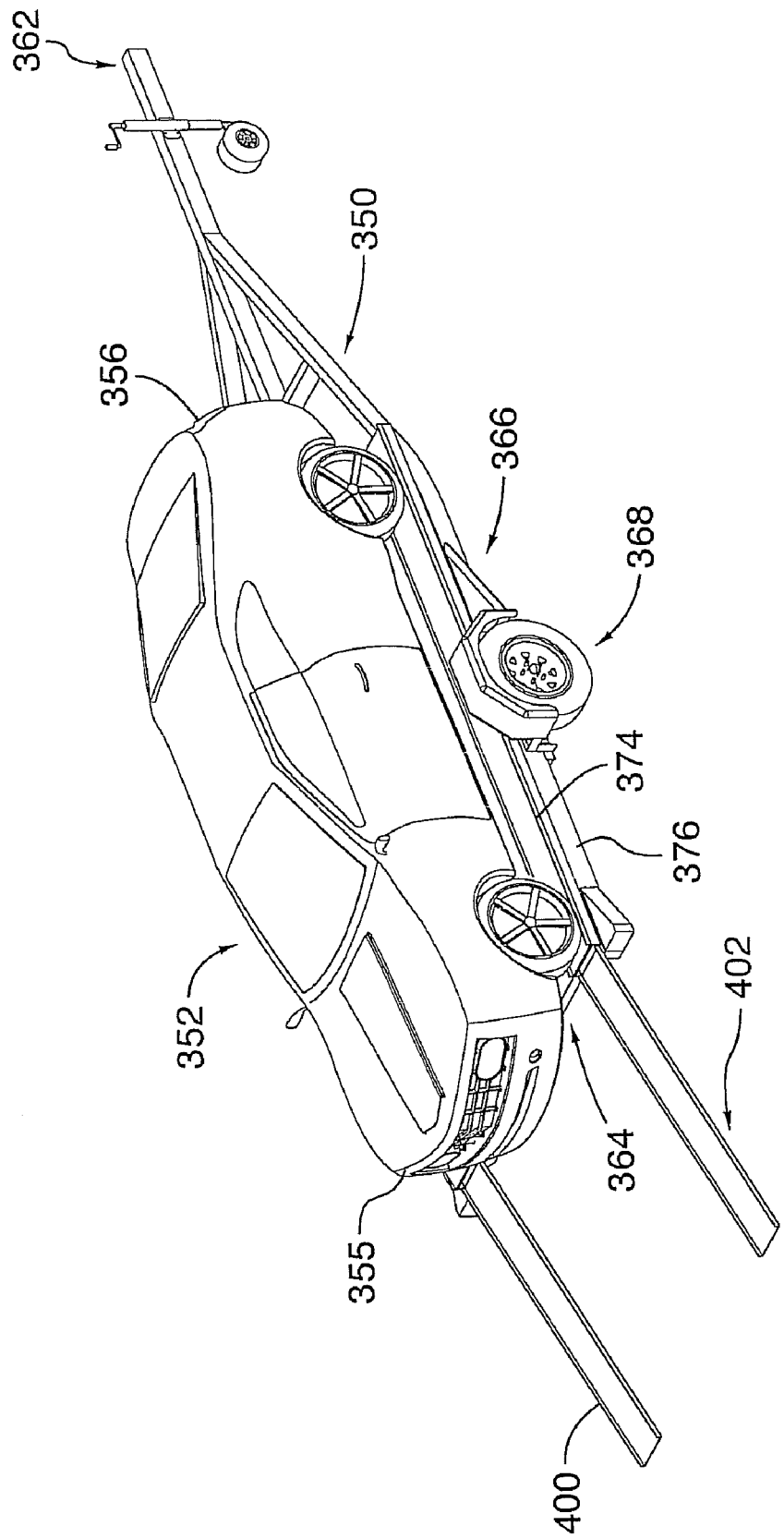
FIG. 26 is a top plan view similar to that illustrated in FIG. 23, except that the front of the car is now shown oriented toward the rear end of the vehicle trailer to facilitate unloading of the car from the vehicle trailer.

FIGS. 23 to 26 show the sequence of rotation of the car 352 on the carousel frame portion 378. In FIG. 24, the car 352 is shown partially rotated with the front end of the car 355 oriented at 45 degrees from the longitudinal axis of the vehicle trailer 22. FIG. 25 shows the carousel frame portion 378 oriented at 90 degrees from the longitudinal axis of the vehicle trailer 20. Finally, FIG. 26 shows the car 352 (and the carousel frame portion 378) rotated 180 degrees from the initial position with the front end 355 of the car 352 now oriented toward the rear end 364 of the vehicle trailer 350. In this final position, the support frame lifting assembly 370 is actuated to deploy the support frame assembly 366 from its raised configuration 374 to its lowered configuration 372. The ramp members 400 are then deployed to their respective extended configurations 402. Thereafter, the car 352 may be driven off the vehicle trailer 350 front end-first.

From the foregoing description, it will be appreciated that the vehicle trailer 350 may be particularly useful in circumstances where it is not desired or practical to have the car 352 driven off the support frame assembly 366 in reverse. This may be the case, for instance, where the car is a vintage, classic or antique car, or further still, a racing car. The trailer 350 has been described in the context of a vehicle but it should be recognized that the trailer 350 could be used to haul other lading as well.

The principles of the present invention may also be applied to construct other types of trailers, for example, livestock or horse trailers. In such embodiments, the carousel frame portion could be formed with a box-like enclosure or superstructure defining a pen or other stowage area for animals to be transported. One or more doors could be provided at the front and rear of the carousel frame portion to provide access to the animal stowage area from either end. The horse trailer could be operated in this same fashion as trailers 20 and 350 and could allow the horse or other animal to exit the enclosure by advancing forward without having to exit the trailer by backing up.

While the trailers 20 and 350 described above are provided with support frame lifting assemblies, this need not be the case in every application. In alternative embodiments, a trailer constructed in accordance with the principles of the present invention having a carousel frame portion rotatable relative to a base frame portion could be configured without a support frame lifting assembly. In such embodiments, the need for a lifting assembly could be obviated by having the carousel frame portion carried above the uppermost margin of the wheel assembly. This could be appropriate for use with small boats, for instance. Such a trailer would be provided with means for preventing rotation of the carousel frame portion relative to the base frame portion, similar to that described above.

Although the foregoing description and accompanying drawings relate to specific preferred embodiments of the present invention as presently contemplated by the inventor, it will be understood that various changes, modifications and adaptations, may be made without departing from the spirit of the invention.

What is claimed is:

1. A boat trailer comprising: a front end configured for hitching to a towing vehicle; a rear end; a wheel assembly disposed between the front and rear ends for rolling engagement with the ground; a support frame assembly carried on the wheel assembly; the support frame assembly having a lower base frame portion and an upper carousel frame portion superimposed on, and pivotally connected to, the base frame portion; the carousel frame portion being configured to support a boat thereon; a support frame lifting assembly connected to the support frame assembly and the wheel assembly; the support frame lifting assembly operable to raise at least a portion of the support frame assembly above the wheel assembly so as to permit rotation of the carousel frame portion relative to the base frame portion.

2. The boat trailer of claim 1 wherein the wheel assembly includes at least one pair of wheels.

3. The boat trailer of claim 2 wherein the at least one pair of wheels includes first and second pairs of wheels arranged in tandem.

4. The boat trailer of claim 1 wherein the wheel assembly includes: a first wheel subassembly located adjacent one side of the support frame assembly; a second wheel assembly located adjacent an opposite side of the support frame assembly; and an axle subassembly connecting the first wheel subassembly to the second subassembly.

5. The boat trailer of claim 4 wherein: the wheel assembly further includes a first fender assembly associated with the first wheel assembly and a second fender assembly associated with the second wheel assembly; the support frame lifting assembly being operable to raise at least a portion of the support frame assembly above the uppermost margin of the first and second fender assemblies.

6. The boat trailer of claim 4 wherein the support frame lifting assembly is connected to the axle subassembly.

7. The boat trailer of claim 1 further comprising a winch assembly and a winch post for supporting the winch assembly; the winch post being carried on the base frame portion at a location closer to the front end than to rear end.

8. The boat trailer of claim 1 wherein: the base frame portion has an uppermost margin; the carousel frame portion has a lowermost margin; at least a portion of one of the uppermost margin and the lowermost margin is provided with a low friction surface to facilitate movement of the carousel frame portion relative to the base frame portion.

9. The boat trailer of claim 1 further comprising means for preventing rotation of the carousel frame portion relative to the base frame portion.

10. The boat trailer of claim 9 wherein the rotation preventing means includes a first locking assembly disposed on one side of the support frame assembly and a second locking assembly disposed on an opposite side of the support frame assembly.

11. The boat trailer of claim 10 wherein: the carousel frame portion includes a pair of first and second, spaced apart, side sills and a plurality of cross-members extending between the pair of first and second side sills to join one to the other; the base frame portion includes a pair of third and fourth, spaced apart, side sills and a plurality of cross-members extending between the pair of third and fourth side sills to join one to the other; the first locking assembly being releasably engageable with the first side sill of the carousel frame portion and the third side sill of the base frame portion when the carousel frame portion and the base frame portion are oriented in a parallel direction; the second locking assembly being releasably engageable with the second side sill of the carousel frame portion and the fourth side sill of the base frame portion when the carousel frame portion and the base frame portion are oriented in a parallel direction.

12. The boat trailer of claim 9 wherein: the rotation preventing means includes at least one locking bar moveable between a locked position and an unlocked position; in the locked position, the locking bar extending above the lowermost margin of the carousel frame portion to thereby present a physical obstacle to the rotation of the carousel frame portion; in the unlocked position, the locking bar extending below the lowermost margin of the carousel frame portion to thereby permit rotation of the carousel frame portion.

13. The boat trailer of claim 12 wherein the locking bar is spring-loaded and biased in the locking position.

14. The boat trailer of claim 1 wherein the carousel frame portion shares a common footprint with a portion of the base frame portion, when the carousel frame portion and the base frame portion are oriented in a parallel direction.

15. The boat trailer of claim 1 wherein the base frame portion is symmetrical about a longitudinal centerline.

16. The boat trailer of claim 1 wherein the carousel frame portion is symmetrical about a longitudinal centerline.

17. The boat trailer of claim 1 wherein the carousel frame portion is symmetrical about a transverse centerline.

18. The boat trailer of claim 1 wherein the carousel frame portion includes a cradle for supporting the hull of boat when it is loaded onto the support frame assembly.

19. The boat trailer of claim 18 wherein the carousel frame portion includes: a pair of first and second, spaced apart, side sills and a plurality of cross-members extending between the pair of first and second side sills to join one to the other; a first support guide rail assembly mounted to the first side sill; a second support guide rail assembly mounted to the second side sill; and a first set of rollers centrally disposed between the first and second side sills in a tandem arrangement; the first and second support guide rail assemblies and the first set of rollers cooperating with each other to define the cradle.

20. The boat trailer of claim 19 wherein the first and second support guide rail assemblies are canted inwardly toward each other.

21. The boat trailer of claim 19 wherein each support guide rail assembly includes a support guide rail carried above the first set of rollers and a plurality of support posts for attaching the guide rail to one of the first and second side sills.

22. The boat trailer of claim 21 wherein each support guide rail assembly includes a second set of rollers carried on the guide rail.

23. The boat trailer of claim 1 wherein the portion of the support frame assembly raised above the wheel assembly includes the carousel frame portion.

24. The boat trailer of claim 1 wherein the support frame lifting assembly is disposed closer to the rear end of the boat trailer than to the front end of the boat trailer.

25. The boat trailer of claim 1 wherein the support frame lifting assembly includes: at least one piston having a first end pivotally connected to the support frame assembly at a first location thereon and a second end pivotally connected to the wheel assembly at a second location thereon; the first location on the support frame member being disposed rearward of the second location on the wheel assembly; at least one pivot arm having a first end and a second end; the first end of the at least one pivot arm being pivotally connected to the support frame assembly at a third location thereon; the third location on the support frame assembly being disposed forwardly of the first location on the support frame assembly; the at least one pivot arm being fixed to the wheel assembly at a fourth location intermediate the first and second ends of the at least one pivot arm.

26. The boat trailer of claim 1 wherein: the support frame lifting assembly includes: at least one piston having a piston cylinder pivotally connected to the support frame assembly, and a piston rod mounted to extend within the piston cylinder and pivotally connected to the wheel assembly; the piston rod moveable between an extended position and a retracted position; and at least one pivot arm having a first end pivotally connected to the support frame assembly, and a second end; the at least one pivot arm being fixed to the wheel assembly at a location intermediate the first and second ends of the at least one pivot arm; as the piston rod moves to the extended position, a portion of the support frame assembly is raised above the wheel assembly.

27. The boat trailer of claim 25 wherein the at least one piston is selected from the group consisting of: (a) a hydraulic piston; (b) a pneumatic piston.

28. The boat trailer of claim 25 wherein: the at least one piston includes a first piston associated with one side of the support frame assembly and a second piston associated with an opposite side of the support frame assembly; and the at least one pivot arm includes a first pivot arm associated with the one side of the support frame assembly and a second pivot arm associated with the opposite side of the support frame assembly.

29. A vehicle trailer comprising: a front end configured for hitching to a towing vehicle; a rear end; a wheel assembly disposed between the front and rear ends for rolling engagement with the ground; a support frame assembly carried on the wheel assembly; the support frame assembly having a lower base frame portion and an upper carousel frame portion superimposed on, and pivotally connected to, the base frame portion; the carousel frame portion being configured to support a vehicle thereon; a support frame lifting assembly connected to the support frame assembly and the wheel assembly; the support frame lifting assembly operable to raise at least a portion of the support frame assembly above the wheel assembly so as to permit rotation of the carousel frame portion relative to the base frame portion.

30. A trailer comprising: a front end configured for hitching to a towing vehicle; a rear end; a wheel assembly disposed between the front and rear ends for rolling engagement with the ground; a support frame assembly carried on the wheel assembly; the support frame assembly having a lower base frame portion and an upper carousel frame portion superimposed on, and pivotally connected to, the base frame portion; the carousel frame portion being configured to support lading thereon; a support frame lifting assembly connected to the support frame assembly and the wheel assembly; the support frame lifting assembly operable to raise at least a portion of the support frame assembly above the wheel assembly so as to permit rotation of the carousel frame portion relative to the base frame portion.

* * * * *